United States Patent
Hamano

(10) Patent No.: US 9,578,231 B2
(45) Date of Patent: Feb. 21, 2017

(54) IMAGE CAPTURE APPARATUS AND METHOD FOR CONTROLLING THE SAME

(71) Applicant: CANON KABUSHIKI KAISHA, Tokyo (JP)

(72) Inventor: Hideyuki Hamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 14/510,931

(22) Filed: Oct. 9, 2014

(65) Prior Publication Data
US 2015/0103232 A1  Apr. 16, 2015

(30) Foreign Application Priority Data

Oct. 11, 2013 (JP) .................................. 2013-214141
Jul. 23, 2014 (JP) .................................. 2014-150136

(51) Int. Cl.
| | |
|---|---|
| *H04N 5/232* | (2006.01) |
| *G02B 7/34* | (2006.01) |
| *H04N 5/369* | (2011.01) |
| *G03B 13/36* | (2006.01) |

(52) U.S. Cl.
CPC .......... *H04N 5/23212* (2013.01); *G02B 7/346* (2013.01); *H04N 5/3696* (2013.01); *G03B 13/36* (2013.01); *H04N 5/23209* (2013.01)

(58) Field of Classification Search
CPC .............. H04N 5/23212; H04N 5/3696; H04N 5/23209; G02B 7/346; G03B 13/36
See application file for complete search history.

(56) References Cited

U.S. PATENT DOCUMENTS

| | | | | |
|---|---|---|---|---|
| 2010/0171844 | A1* | 7/2010 | Okamoto | H04N 5/232 348/229.1 |
| 2010/0289940 | A1* | 11/2010 | Toguchi | H04N 5/23212 348/345 |
| 2011/0267706 | A1* | 11/2011 | Karasawa | H04N 5/23212 359/698 |
| 2012/0212661 | A1* | 8/2012 | Yamaguchi | G02B 7/38 348/346 |

FOREIGN PATENT DOCUMENTS

| | | |
|---|---|---|
| JP | 2010-117679 A | 5/2010 |
| JP | 2013-186201 A | 9/2013 |

* cited by examiner

*Primary Examiner* — Christopher K Peterson
(74) *Attorney, Agent, or Firm* — Cowan, Liebowitz & Latman, P.C.

(57) ABSTRACT

If it is determined that an imaging optical system is not in an in-focus state, an interval for obtaining a phase-difference signal is set to a second time interval that is faster than a first time interval when a defocus amount that is obtained using the phase-difference signal that is output from an image sensor is a predetermined threshold or more, and the interval for obtaining a phase-difference signal is set to the first time interval when the defocus amount is less than the predetermined threshold.

18 Claims, 12 Drawing Sheets

IMAGE CAPTURE APPARATUS AND METHOD FOR CONTROLLING THE SAME

BACKGROUND OF THE INVENTION

Field of the Invention

The present invention relates to an image capture apparatus and a method for controlling the same.

Description of the Related Art

Electronic devices having an image capture function, such as digital cameras, mobile phones with a camera, game consoles, and personal computers, typically realize an autofocus function.

Japanese Patent Laid-Open No. 2010-117679 discloses an image sensor including focus detection pixels in which a range of light that is incident on photoelectric conversion areas is controlled by a light-shielding film having openings that are eccentric to the light axes of microlenses provided on the pixels. Because such focus detection pixels each receive outgoing light from a partial region of an exit pupil of a shooting lens, it is possible to obtain a defocus amount of an imaging optical system based on a phase difference between a pair of output waveforms that can be obtained from the focus detection pixels, the focus detection pixels being provided with the light-shielding film having openings that are eccentric in the different directions.

Furthermore, an image sensor in which each pixel includes one microlens and a plurality of photoelectric conversion areas as disclosed in Japanese Patent Laid-Open No. 2013-186201 can also be used to obtain a defocus amount of an imaging optical system based on the same principle. This is because the plurality of photoelectric conversion areas in one pixel receive, via the same microlens, outgoing light from different regions of an exit pupil of an imaging optical system.

Accordingly, autofocus detection of a phase-difference detection method that uses signals obtained from an image sensor, instead of a separate focus detection sensor, is also referred to as image-plane phase-difference detection AF.

Such a focus detection method that uses output signals of photoelectric conversion areas that receives, via a microlens, outgoing light from different regions of an exit pupil of a shooting lens is likely to be affected by vignetting of the shooting lens. Once vignetting of the shooting lens occurred, a pair of output waveforms for use in phase difference detection varies in shape, deteriorating the phase-difference detection accuracy and thus focus detection accuracy. Furthermore, the adverse effect of vignetting on the phase-difference detection accuracy increases with an increase in the defocus amount. This is because, since the larger the defocus amount the lower the contrast, the output waveforms significantly vary in shape due to vignetting.

SUMMARY OF THE INVENTION

The present invention was made in view of such conventional problems. The present invention improves the focus detection accuracy of an image capture apparatus and a method for controlling the same, in which focus detection of a phase-difference detection method is performed using phase-difference signals that are output from an image sensor.

According to an aspect of the present invention, there is provided an image capture apparatus comprising: a focus adjustment unit configured to perform focus adjustment using a phase-difference signal that is output from an image sensor: a computing unit configured to compute information on a defocus amount using the phase-difference signal that is output from the image sensor; and a control unit configured to control a frame rate with which the phase-difference signal is obtained, wherein if preparation operations for capturing have been detected and it is determined based on the information on the defocus amount that an in-focus state is not obtained, the control unit sets the frame rate to be faster than a frame rate before the preparation operations for capturing are detected when the information on the defocus amount is equal to or more than a first threshold, and the control unit maintains the frame rate when the information on the defocus amount is less than the first threshold.

According to another aspect of the present invention, there is provided an image capture apparatus comprising: a focus adjustment unit configured to perform focus adjustment using a focus detection signal; a computing unit configured to compute information on a defocus amount using the focus detection signal; and a control unit configured to control a frame rate with which the phase-difference signal is obtained, wherein if preparation operations for capturing have been detected and it is determined based on the information on the defocus amount that an in-focus state is not obtained, the control unit sets the frame rate to be faster than a frame rate before the preparation operations for capturing have been detected when the information on the defocus amount is equal to or more than a first threshold, and the control unit maintains the frame rate when the information on the defocus amount is less than the first threshold.

According to a further aspect of the present invention, there is provided a method for controlling an image capture apparatus, comprising: a focus adjustment step of performing focus adjustment using a phase-difference signal that is output from an image sensor; a computing step of computing information on a defocus amount using the phase-difference signal that is output from the image sensor; and a control step of controlling a frame rate with which the phase-difference signal is obtained to a frame rate, wherein if preparation operations for capturing have been detected and it is determined based on the information on the defocus amount that an in-focus state is not obtained, the control step sets the frame rate to be faster than a frame rate before the preparation operations for capturing are detected when the information on the defocus amount is equal to or more than a first threshold, and the control step maintains the frame rate when the information on the defocus amount is less than the first threshold.

According to a yet further aspect of the present invention, there is provided a method for controlling an image capture apparatus, comprising: a focus adjustment step of performing focus adjustment using a focus detection signal; a computing step of computing information on a defocus amount using the focus detection signal; and a control step of controlling a frame rate with which the focus detection signal is obtained, wherein if preparation operations for capturing have been detected and it is determined based on the information on the defocus amount that an in-focus state is not obtained, the control step sets the frame rate to be faster than a frame rate before the preparation operations for capturing have been detected when the information on the defocus amount is equal to or more than a first threshold, and the control step maintains the frame rate when the information on the defocus amount is less than the first threshold.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

The following will describe an example in which a focus detection apparatus according to an embodiment of the present invention is applied to a lens-exchangeable, single-lens reflex type digital camera, but the focus detection apparatus according to the embodiment of the present invention is also applicable to any other image capture apparatus or electronic device that has an image capture function.

Figure 1:
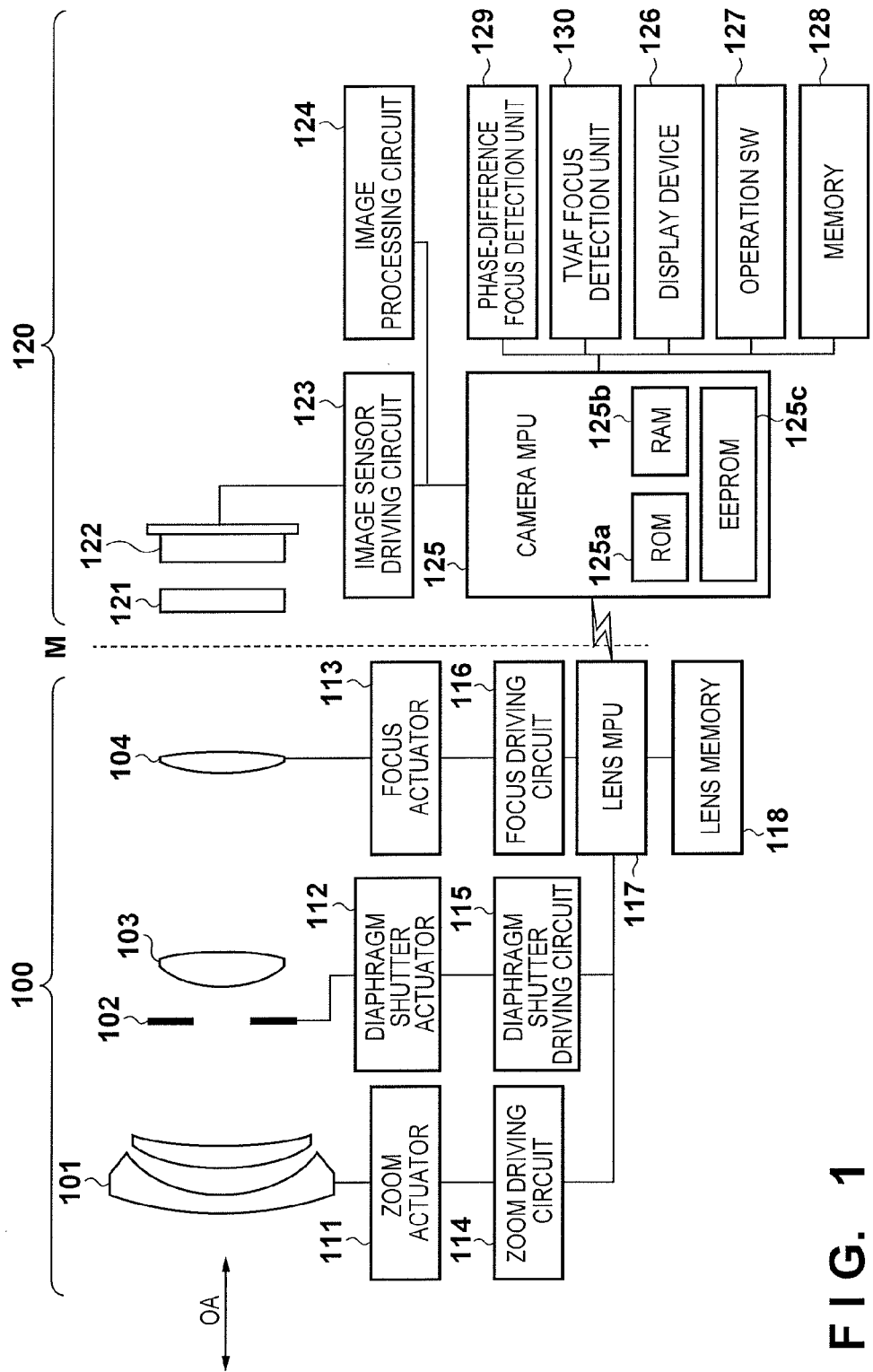
FIG. 1 is a block diagram illustrating an example of functional configuration of a digital camera to which a focus detection apparatus according to embodiments of the present invention is applied.

FIG. 1 is a block diagram illustrating an example of a functional configuration of a digital camera to which the focus detection apparatus of the present embodiment is applied. The digital camera includes a lens unit 100 (lens apparatus) and a camera main body 120 (image capture apparatus). The lens unit 100 is connected mechanically, electrically, and detachably to the camera main body 120 via a mount M indicated by the dashed line.

The lens unit 100 includes a first lens group 101, a diaphragm shutter 102, a second lens group 103, a focus lens group (hereinafter, referred to simply as "focus lens") 104, and a driving/controlling system. Accordingly, the lens unit 100 is an imaging optical system (image capture optical system) that includes the focus lens 104 and forms an object image.

The first lens group 101 is arranged at a front end of the lens unit 100, and is held so as to be movable force and back in a light-axis direction OA. The diaphragm shutter 102 functions as a shutter for adjusting a light amount in capturing by adjusting the diameter of its aperture, and for controlling the exposure time when a still image is captured. The diaphragm shutter 102 and the second lens group 103, serving as an integrated components, move force and back in the light-axis direction OA, and realize a zoom function (variable angle of view) of the lens unit 100 in corporation with the force and back moving operation of the first lens group 101. The focus lens 104 is movable in the light-axis direction OA. By adjusting the position of the focus lens 104, the focus state of the lens unit 100 is adjusted.

The driving/controlling system of the lens unit 100 includes the following components: a zoom actuator 111; a diaphragm shutter actuator 112; a focus actuator 113; a zoom driving circuit 114; a diaphragm shutter driving circuit 115; a focus driving circuit 116; a lens MPU 117; and a lens memory 118.

The zoom driving circuit 114 drives the zoom actuator 111 in accordance with control of the lens MPU 117 to drive the first lens group 101 and the second lens group 103 so that they move force and back in the light-axis direction OA. The diaphragm shutter driving circuit 115 drives and controls the diaphragm shutter actuator 112 in accordance with control of the lens MPU 117, so as to control the diameter of its aperture and an operation of the diaphragm shutter 102. The focus driving circuit 116 drives and controls the focus actuator 113 in accordance with control of the lens MPU 117, so as to drive the focus lens 104 so that it moves force and back in the light-axis direction OA. Furthermore, the focus driving circuit 116 provides the position of the focus lens 104 that was detected by the focus actuator 113 to the lens MPU 117.

The lens MPU 117 controls and manages the constituent components of the lens unit 100 with or without exchanging commands and data with a camera MPU 125 by executing a program stored in advance. The lens MPU 117 provides, to the camera MPU 125, lens information, such as for example, the position of the focus lens 104 that was obtained via the focus driving circuit 116, and the current angle of view based on the positions of the first lens group 101 and the second lens group 103. The lens memory 118 has stored therein optical information that is necessary for focus detection control by the lens MPU 117.

The camera main body 120 includes an optical low-pass filter 121, an image sensor 122, and a driving/controlling system. The optical low-pass filter 121 and the image sensor 122 constitute a part of the imaging optical system that forms an object image using a light flux from the lens unit 100. That is, in the present embodiment, the first lens group 101, the diaphragm shutter 102, the second lens group 103, the focus lens 104, the optical low-pass filter 121, and the image sensor 122 constitute the imaging optical system. Note that it is possible to realize focus adjustment of the lens unit 100 by moving the image sensor 122 in the light-axis direction OA, instead of or in addition to driving the focus lens 104. Accordingly, the focus lens 104 and the image sensor 122 serve as a focus adjustment member of the imaging optical system.

The optical low-pass filter 121 reduces high spatial frequency components, which may cause false color or moire on a captured image. The image sensor 122 is constituted by a photoelectric conversion element such as a CMOS sensor or the like including m pixels in the lateral direction and n pixels in the height direction, and its peripheral circuits, and is configured such that all the pixels can perform output independently. Furthermore, although the image sensor 122 of the present embodiment can only need to perform the image-plane phase-difference detection AF, the image sensor 122 may be configured to include a plurality of image capture pixels for forming an object image, and a plurality of focus detection pixels for generating a signal for use in focus detection of a phase-difference detection method. Note that the image sensor 122 may have a configuration in which, as described in Japanese Patent Laid-Open No. 2013-186201, the image capture pixels and the focus detection pixels are not distinguished. Note that the configuration of the image sensor 122 will be described in detail later.

The driving/controlling system includes an image sensor driving circuit 123, an image processing circuit 124, a camera MPU 125, a display device 126, an operation switch group (operation SW) 127, a memory 128, a phase-difference focus detection unit 129, and a TVAF focus detection unit 130.

The image sensor driving circuit 123 controls a driving frame rate or the like of the image sensor 122 in accordance with control of the camera MPU 125. Furthermore, the image sensor driving circuit 123 A/D-converts an image signal read from the image sensor 122, and transmits the converted signal to the camera MPU 125 and the image processing circuit 124.

The image processing circuit 124 performs image processing, such as gamma correction (tone correction), demosaicing (color interpolation), and compression coding, on the image signal obtained from the image sensor 122 in accordance with control of the camera MPU 125. The image processing circuit 124 also performs decoding of the image data read from the memory 128. The camera MPU 125 executes a program stored in a ROM 125*a* to control and manage operations of the entire digital camera constituted by the camera main body 120 and the lens unit 100, the operations including the autofocus detection operation described later. The camera MPU 125 further includes a RAM 125*b* for use, for example, as a work area during execution of the program, and an EEPROM 125*c* in which various types of setting values and the like are stored. The camera MPU 125 controls the operation of the lens unit 100 by communicating commands and data with the lens MPU 117 connected via a signal line of the mount M, and obtains information such as optical property, the focal length (angle of view), the focus lens position, and the f-number, for example.

Furthermore, since vignetting of the imaging optical system significantly affects the reliability of focus detection when the image height of a focus detection area is great, it is also possible to perform, before supplying an image signal to the phase-difference focus detection unit 129, correction for mitigating the adverse effect of vignetting on the image signal in the camera MPU 125 and the image processing circuit 124.

The display device 126 is constituted by a LCD and the like, and displays information on the capturing mode of the camera, a preview image before capturing, a confirmation image after capturing, display screen for indicating an in-focus state during focus detection, and the like. The operation switch group 127 is constituted by a power switch, a release (capturing trigger) switch, a zoom operation switch, and a capturing mode selection switch, and the like.

The memory 128 is a recording medium in which captured images are recorded and is, for example, a detachable nonvolatile memory card, but the memory 128 may be a build-in memory, an optical recording medium, or a magnetic recording medium.

The phase-difference focus detection unit 129 performs focus detection by a phase-difference detection method based on image signals for focus detection that are obtained from the image sensor 122, and obtains a defocus amount. More specifically, the phase-difference focus detection unit 129 performs focus detection (computation of a defocus amount and focus direction) based on a phase difference between a pair of image signals obtained from photoelectric conversion elements that receive outgoing light from different pupil regions, among photoelectric conversion areas of each pixel in the focus detection area. Note that this focus detection method of the image-plane phase-difference detection AF will be described in detail later.

The TVAF focus detection unit 130 performs contrast focus detection (TVAF) for searching for a position of the focus lens 104 at which a contrast evaluation value (AF evaluation value), which is obtained by the image processing circuit 124 based on a high-frequency component of an image, has a peak value.

Accordingly, the digital camera of the present embodiment can perform both the image-plane phase-difference detection AF and the TVAF, and can select and use either one or both in a combined manner, depending on the situation, through control of the camera MPU 125.

Figure 2:
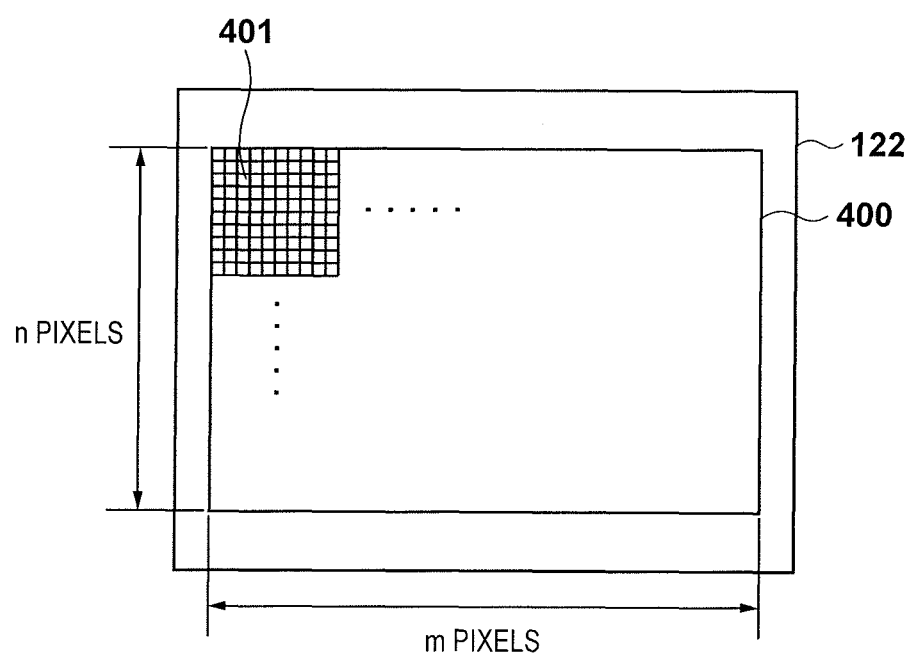
FIG. 2 is a diagram schematically illustrating the state of a pixel array included in an image sensor of the embodiments when seen from a lens unit side.

Hereinafter, the image-plane phase-difference detection AF will be described in detail. FIG. 2 is a diagram schematically illustrating the state of a pixel array included in the image sensor 122 when seen from the lens unit 100 side. The image sensor 122 includes a pixel array 400 in which m pixels 401 in the lateral direction and n pixels 401 in the vertical direction are arranged, and it is assumed in the present embodiment that the entire pixel array 400 is a capturing range. In FIG. 2, in order to eliminate complication, only 10×10 pixels 401 in the upper left part are shown, and other pixels are omitted. Color filters of a primary-color Bayer array with a cycle of 2×2 pixels are formed on the pixel array 400 in an on-chip fashion. Therefore, each of the pixels 401 has a filter of any one of colors R, G, and B, and in the following description, a pixel having an X-color (where X is R, G, or B) filter is referred to as an X-pixel.

As described above, the image sensor 122 of the present embodiment includes, as the pixels 401, a plurality of image capture pixels and a plurality of focus detection pixels. The image capture pixels are configured to receive outgoing light from the entire region of an exit pupil of the imaging optical system, and to output a pixel signal having a level that corresponds to the amount of the received light. Furthermore, the focus detection pixels are configured to receive outgoing light from a partial region of an exit pupil of the imaging optical system, and to output a focus detection signal depending on the amount of the received light. Note that the focus detection pixels include at least two types of focus detection pixels that are configured to receive outgoing light from different partial regions. Also, one image signal for phase-difference detection is generated based on outputs of a group of the focus detection pixels of the same type. Hereinafter, two image signals for use in phase-difference detection are referred to as an A-image (signal) and a B-image (signal).

When the color filters of a primary-color Bayer array are formed according to the present embodiment, among a unit array of color filters of 2 rows×2 columns, a pair of G-pixels that are diagonally located is of the image capture pixels, and an R-pixel and a B-pixel are of the focus detection pixels. Note that the focus detection pixels do not have color filters, or have colorless filters. This is because the focus detection pixels receive smaller amount of light than that of the image capture pixels, and thus suppress attenuation due to the color filters. The focus detection pixels are arranged discretely so as to enable an image signal for phase-difference detection to be generated from a focus detection area, and to prevent the accuracy of interpolation of pixel signals at the locations of the focus detection pixels from deteriorating.

FIGS. 3A to 4B are diagrams schematically illustrating configurations of the image capture pixels and the focus detection pixels, respectively. The present embodiment employs the primary-color Bayer array in which, among 4 pixels of 2 rows×2 columns, 2 pixels having G (green) spectral sensitivity are arranged diagonally, and other 2 pixels are a pixel having R (red) spectral sensitivity and a pixel having B (blue) spectral sensitivity. The focus detection pixels having the structure that will be described later are arranged in this Bayer array.

Figures 3A, 3B:
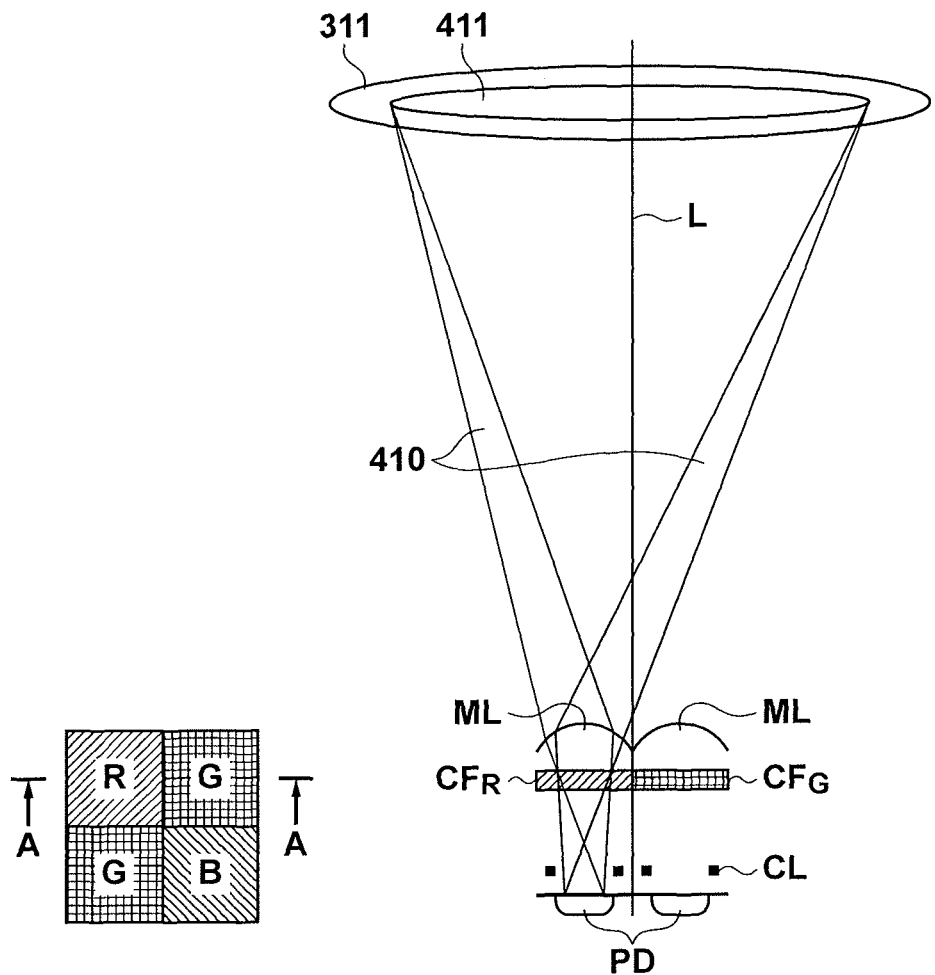
FIGS. 3A and 3B are diagrams illustrating an example of a structure of image capture pixels included in the image sensor of the embodiments.
Figures 4A, 4B:
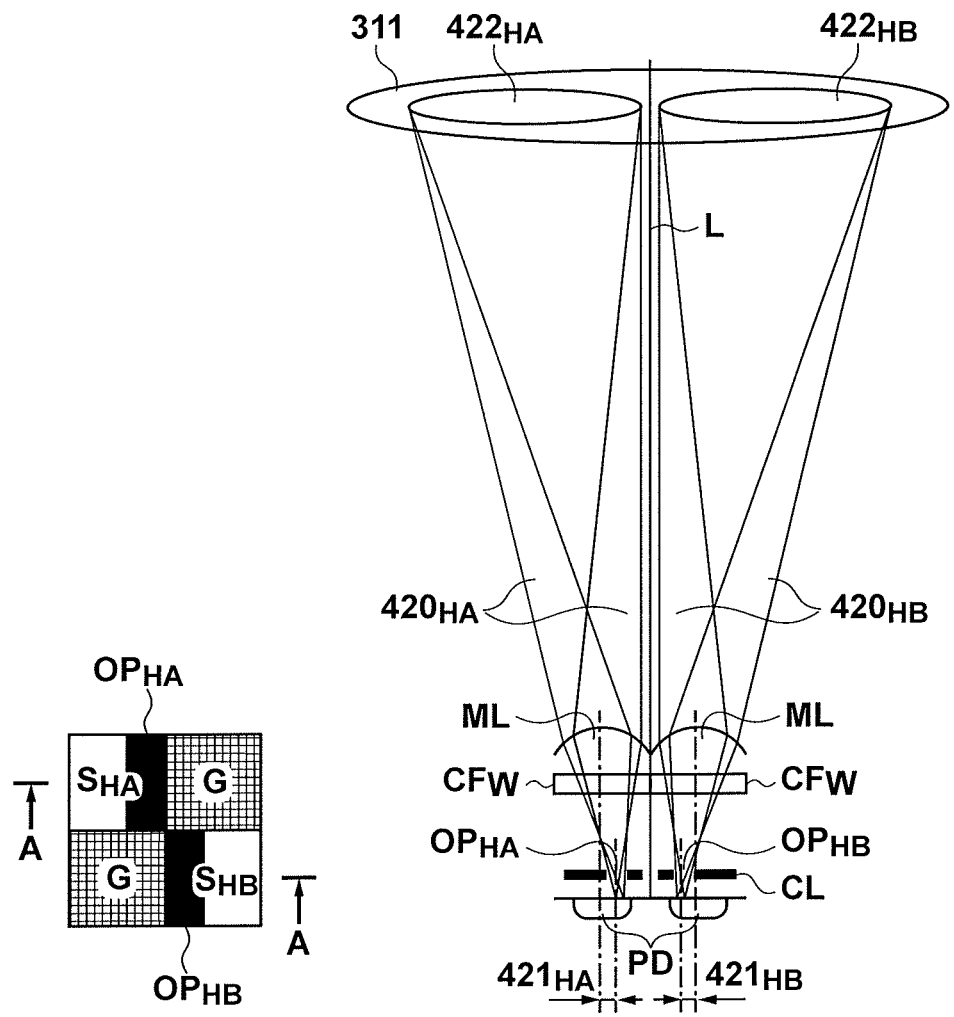
FIGS. 4A and 4B are diagrams illustrating an example of a structure of focus detection pixels that perform pupil division in the horizontal direction of the lens unit, of the embodiments.

FIGS. 3A and 4A are diagrams illustrating the states of pixels of 2 rows×2 columns when seen from above the color filter. FIGS. 3B and 4B are respectively cross-sectional views taken along the lines A-A of FIGS. 3A and 4A, and show light paths from an imaging optical system. In FIGS. 3B and 4B, the lens unit 100 is shown as a phantom lens 311, and members that are not essential for the description of the configuration of the pixels are omitted.

FIG. 3A is a plan view of image capture pixels of 2 rows×2 columns that are extracted from the pixel array 400. The pixel array 400 has color filters having a configuration in which the same pattern is arranged repeatedly. In FIG. 3B, ML refers to an on-chip microlens arranged at the foreground of a pixel, $CF_R$ refers to an R (red) color filter, and $CF_G$ refers to a G (green) color filter. A photo diode (PD) schematically indicates a photoelectric conversion area of the image sensor 122. A contact layer (CL) refers to a wiring layer in the image sensor 122 that forms a signal line through which various types of signals are transmitted. The lens 311 is a term meaning a phantom lens of the lens unit 100, and has an exit pupil 411. L refers to the optical axis of the lens 311. Note that the light path shown in FIG. 3B is a light path to pixels located near the center of the image sensor 122, that is, near the intersection point with the optical axis L of the lens 311.

Here, the on-chip microlenses ML of the image capture pixels and the photoelectric conversion elements PD are configured so as to take in light fluxes that have passed through the lens 311 as efficiently as possible. In other words, the exit pupil 411 of the imaging optical system and the photoelectric conversion elements PD are in a conjugal relationship with the microlenses ML, and the photoelectric conversion areas PD are designed to have a large effective areas. In FIG. 3B, outgoing light 410 from the entire region of the exit pupil 411 is incident on the photoelectric conversion element PD. Note that, since FIG. 3B has described the incident light on the R-pixel, the same applied to the incident light on the G-pixel and the B-pixel. Furthermore, the microlenses ML, the color filters ($CF_R$ and $CF_G$), the photoelectric conversion areas PD, and the wiring layer CL are enlarged for ease of understanding, but the actual sizes thereof are in the order of microns.

FIGS. 4A and 4B are a plan view and a cross-sectional view of the focus detection pixels for dividing the pupil in the horizontal direction (lateral direction) of the image sensor 122. Here, "horizontal direction" refers to a longitudinal direction of the image sensor 122 shown in FIG. 2. FIG. 4A is a plan view of pixels of 2 rows×2 columns that includes the focus detection pixels.

In the present embodiment, as described above, the focus detection pixels, instead of an R-pixel and a B-pixel, are arranged. This is because, in view of visual perception characteristics of human that is sensitive to luminance information but is insensitive to color information, good image quality can be achieved by obtaining information on G-pixels that are used as main components of luminance information without using interpolation. In FIG. 4A, pixels $S_{HA}$ and $S_{HB}$ are focus detection pixels.

FIG. 4B shows a cross-sectional view taken along the line A-A of FIG. 4A. The microlenses ML and the photoelectric conversion areas PD have the same structures as those of the image capture pixels shown in FIG. 3B. Note that light paths shown in FIG. 4B are also light paths to pixels located near the center of the image sensor 122, that is, near the intersection point with the optical axis L of the lens 311.

In the present embodiment, since a signal of the focus detection pixel is not used for image generation, a transparent film $CF_W$, instead of the color separation color filter, is arranged. Furthermore, in order to divide the exit pupil 411 at the image sensor 122 (in order to receive outgoing light from partial regions of the exit pupil 411), the wiring layer CL is arranged so as to function as a light-shielding film, and openings of the wiring layer CL are arranged at positions that are shifted from the center of the microlens ML.

An opening $OP_{HA}$ of the wiring layer CL that is provided on the pixel $S_{HA}$ is eccentric to the center line of the microlens ML rightward to the extent of $421_{HA}$. Accordingly, the pixel $S_{HA}$ receives a flux $420_{HA}$ of light that has passed through an exit pupil region $422_{HA}$ on the left side of the optical axis L of the lens 311. Similarly, an opening $OP_{HB}$ of the wiring layer CL that is provided on the pixel $S_{HB}$ is eccentric to the center line of the microlens ML leftward to the extent of $421_{HB}$. Accordingly, the pixel $S_{HB}$ receives a flux $420_{HB}$ of light that has passed through an exit pupil region $422_{HB}$ on the right side of the optical axis L of the lens 311. Note that the eccentricity amount $421_{HA}$ is equal to the eccentricity amount $421_{HB}$. In this way, the wiring layer CL, which has the openings OP that are eccentric to the light axes of the microlenses ML in opposing directions, is provided on a pair of photoelectric conversion areas PD. Therefore, it is possible for the light fluxes $420_{HA}$ and $420_{HB}$, which have passed through different partial regions of the exit pupils of the lens 311, to be incident on the pair of focus detection pixels $S_{HA}$ and $S_{HB}$, in other words, it is possible to realize pupil division.

The plurality of focus detection pixels $S_{HA}$ having the above-described configuration are arranged in the horizontal direction, and an object image that is obtained based on this pixel group is defined as the A-image. Furthermore, the focus detection pixels $S_{HB}$ are arranged in the horizontal direction, and an object image that is obtained based on this pixel group is defined as the B-image. Furthermore, by detecting a phase difference between the obtained A-image and B-image, it is possible to detect an out-of-focus amount (defocus amount) of the object images that have a luminance distribution in the horizontal direction.

Note that FIG. 4B shows the configuration of the focus detection pixels that are arranged near the center of the image sensor 122, that is, at positions at which the image height is small. On the other hand, it is possible to divide the exit pupil 411 by letting, as the image height increases, the microlenses ML and the openings $OP_{HA}$ and $OP_{HB}$ of the wiring layer CL be eccentric in a state different from that of FIG. 4B. For example, the microlenses ML and the openings $OP_{HA}$ and $OP_{HB}$ of the wiring layer CL are arranged such that the center of the substantially spherical microlens ML is located on the line connecting the center of the opening $OP_{HA}$ to the center of the exit pupil 411. With this, also in the peripheral part of the image sensor 122 that has an increased image height, it is possible to perform pupil division similarly to the focus detection pixel near the center of the image sensor 122 shown in FIG. 4B. The same applies to the opening $OP_{HB}$. Note that it is also possible to subject an image signal obtained from the focus detection pixels to correction processing as disclosed in Japanese Patent Laid-Open No. 2010-117679.

Meanwhile, the focus detection pixels $S_{HA}$ and $S_{HB}$ shown in FIG. 4A can perform focus detection with respect to an object having a luminance distribution in the horizontal direction of a captured screen, e.g., a vertical line, but cannot perform focus detection with respect to an object having a luminance distribution in the vertical direction, e.g., a lateral line. In order to perform focus detection with respect to an object having a luminance distribution in the vertical direction, it is sufficient to provide, on the image sensor 122, focus detection pixels that perform pupil division also in the vertical direction of the imaging optical system. In the present embodiment, the focus detection pixels are arranged so that focus detection in both directions is possible, as will be described later. Furthermore, because a signal obtained from the focus detection pixel cannot be used as a signal of an R-pixel or a B-pixel, the focus detection pixel is treated as a so-called defect pixel, and a signal is generated by interpolation computation of signals of the image capture pixels that are present in the vicinity thereof. Therefore, the focus detection pixels are arranged not continuously but discretely, in order to prevent deterioration of the accuracy of the interpolation computation.

Note that, as described above, the configuration including a plurality of image capture pixels for forming an object image, and a plurality of focus detection pixels for generating a signal for use in focus detection of a phase-difference detection method is not essential. The image sensor 122 may also have a configuration as disclosed in Japanese Patent Laid-Open No. 2013-186201 in which one pixel includes a plurality of photoelectric conversion areas. In this case, it is sufficient to treat one area, among the plurality of photoelectric conversion areas of the one pixel, as the focus detection pixel $S_{HA}$, and another area as the focus detection pixel $S_{HB}$.

Figure 5:
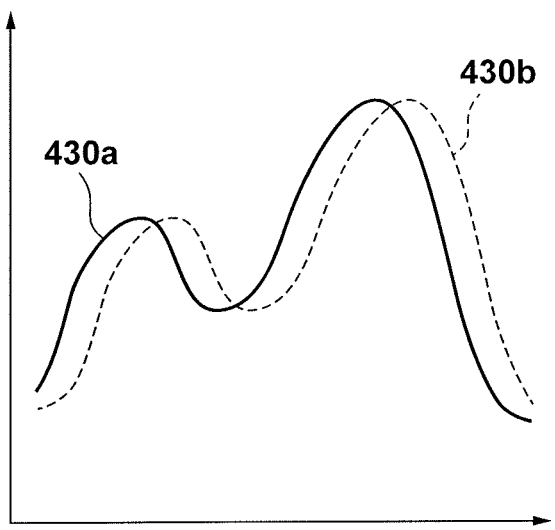
FIG. 5 is a diagram illustrating examples of a pair of focus detection signals for use in focus detection of a phase-difference detection method.

FIG. 5 shows examples of a pair of focus detection signals 430a and 430b that are obtained by performing, in the image processing circuit 124, various type of correction on output signals of the plurality of focus detection pixels $S_{HA}$ and the plurality of focus detection pixels $S_{HB}$, and are then transmitted to the phase-difference focus detection unit 129. In FIG. 5, the lateral axis indicates a direction in which the plurality of focus detection pixels used for generating the focus detection signal are arranged, and the vertical axis indicates the intensity of the signal. Here, since the lens unit 100 is in the state in which it is defocused to the image sensor 122, the focus detection signal 430a is shifted to the left side and the focus detection signal 430b is shifted to the right side. By computing a shift amount (phase difference) between the focus detection signals 430a and 430b in the phase-difference focus detection unit 129 using a well-known correlation operation, it is possible to recognize the defocus amount and the defocus direction of the lens unit 100.

Based on the defocus amount and the defocus direction that are obtained from the phase-difference focus detection unit 129, the camera MPU 125 obtains the driving amount and the driving direction of the focus lens 104. The camera MPU 125 decides, based on information on the position of the focus lens 104 transmitted from the lens MPU 117, the position to which the focus lens 104 is to be moved in order to bring the imaging optical system into focus, and transmits the decided position to the lens MPU 117. The lens MPU 117 drives the focus lens 104 to the designated position (in-focus position) via the focus driving circuit 116 and the focus actuator 113. Note that, when a defocus amount that is detectable by the image-plane phase-difference detection AF is less than the maximum defocus amount of the imaging optical system, it is necessary to perform a multiple times of defocus amount detection and driving of the focus lens 104, in order to move the focus lens 104 to the in-focus position.

Figure 6A:
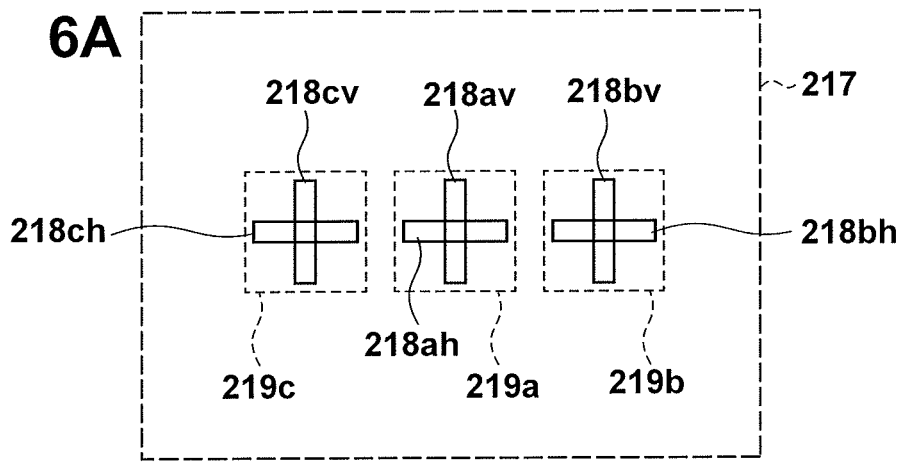
FIGS. 6A and 6B are diagrams illustrating an example of focus detection areas in capturing ranges and the state of objects.

FIG. 6A shows focus detection areas in a capturing range, and image-plane phase-difference detection AF and TVAF are performed based on signals obtained from, among the pixels of the image sensor 122, some pixels that are included in regions corresponding to the focus detection areas. FIG. 6A shows not only the focus detection areas including pixels that are to be subjected to pupil division in the horizontal direction (lateral direction) of the imaging optical system as shown in FIG. 4B, but also the focus detection areas including pixels that are to be subjected to pupil division in the vertical direction (height direction). Furthermore, a capturing range 217 is a region that corresponds to the pixel array 400 of FIG. 2.

In the capturing range 217, three regions each in the vertical and lateral directions, that is, focus detection areas 218ah, 218bh, 218ch, 218av, 218bv, and 218cv are set, the focus detection areas being subjected to the image-plane phase-difference detection AF. Furthermore, the vertical and lateral focus detection areas are arranged so as to cross each other, forming so-called crossed focus detection areas. The present embodiment has a configuration in which the crossed focus detection areas for the image-plane phase-difference detection AF are provided at three areas, namely, as shown in the figure, the central area of the capturing range 217, and two areas that are to the right and left of the central area. Furthermore, three focus detection areas 219a, 219b, and 219c, which are subjected to TVAF, are set so as to respectively include the focus detection areas of the three areas that are subjected to the image-plane phase-difference detection AF. In the focus detection areas that are subjected to TVAF, a contrast evaluation value is detected using high-frequency components in the horizontal direction of FIGS. 6A and 6B.

Figure 6B:
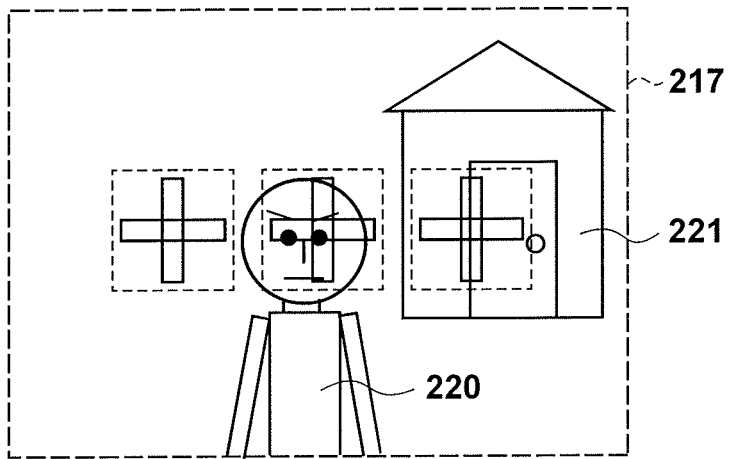

Note that FIGS. 6A and 6B show the examples in which the focus detection areas are arranged in three areas that are roughly classified, but the present invention is not limited to three areas and a plurality of areas may be arranged at any position.

Figure 7:
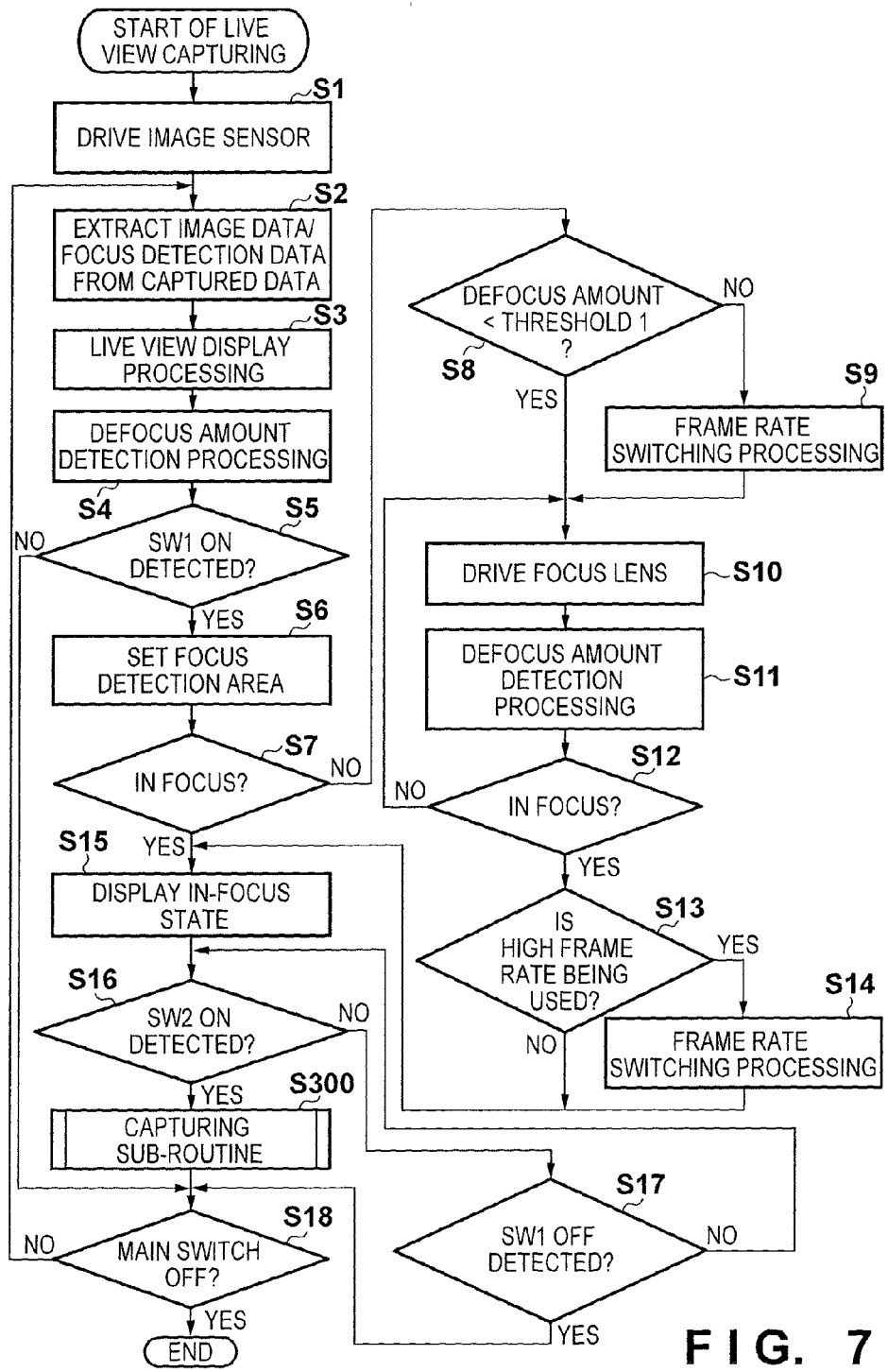
FIG. 7 is a flowchart illustrating focus detection and capturing operations of a digital camera according to a first embodiment.

FIG. 7 is a flowchart illustrating focus detection and capturing operations of the digital camera according to the present embodiment. FIG. 7 shows the operations of live view capturing for performing capturing starting from a live view state (moving image capturing state) such as a capturing stand-by state, the operation being realized mainly by the camera MPU 125.

In step S1, the image sensor driving circuit 123 drives the image sensor 122 in accordance with control of the camera MPU 125, and obtains captured data. Here, this driving operation is for capturing a moving image for live-view display, and thus capturing using a so-called electronic shutter in which an electric charge is accumulated and read for a time period that corresponds to a frame rate for live-view display is performed. The live view display performed here is for a photographer to confirm a capturing range and a capturing condition, and the frame rate may be, for example, 30 frames/second (capturing interval 33.3 ms) or 60 frames/second (capturing interval 16.6 ms).

In step S2, the camera MPU 125 obtains, among the captured data obtained in step S1, focus detection data obtained from the focus detection pixels included in the three focus detection areas shown in FIGS. 6A and 6B. The camera MPU 125 also obtains image data that is obtained by the image processing circuit 124 applying color interpolation processing or processing for interpolating the focus detection pixels to the captured data obtained in step S1. Accordingly, it is possible to obtain image data and focus detection data with a single capturing process. Note that, in the configuration in which a plurality of photoelectric conversion areas are provided in one pixel, the image processing circuit 124 does not need to perform interpolation processing of the focus detection pixels but, on the other hand, needs to sum up signals of the plurality of photoelectric conversion areas in order to obtain a signal of each pixel.

In step S3, the camera MPU 125 generates, using the image processing circuit 124, an image for live view display based on the image data obtained in step S2, and displays the generated image on the display device 126. Note that the image for live view display is, for example, an image that is minified according to the resolution of the display device 126, and it is also possible to perform minifying processing in the image processing circuit 124 when generating the image data in step S2. In this case, the camera MPU 125 lets the display device 126 display the image data obtained in step S2. As described above, since capturing and display are performed with a predetermined frame rate during live view display, it is possible for the photographer to adjust, through the display device 126, a composition or an exposure condition in capturing, for example.

In step S4, the camera MPU 125 obtains a defocus amount and a defocus direction for each focus detection area based on the focus detection data of the three focus detection areas obtained in step S2 using the phase-difference focus detection unit 129. In the present embodiment, the camera MPU 125 generates an image signal for focus detection, and the phase-difference focus detection unit 129 performs processing for computing the shift amount (phase difference) of the focus detection signals and for obtaining a defocus amount and a defocus direction based on the computed shift amount.

In step S5, the camera MPU 125 detects turning ON/OFF (preparation operations for capturing) of a switch Sw1, which indicates the start of preparations for capturing. A release (capturing trigger) switch, which is a switch of the operation switch group 127, can detect turning ON/OFF of two stages depending on the pressed amount, and the above-described turning ON/OFF of the Sw1 corresponds to turning ON/OFF of the first stage of the release (capturing trigger) switch.

If turning ON of the Sw1 has not been detected in step S5 (or turning OFF has been detected), the camera MPU 125 advances the procedure to step S18, and determines whether or not a main switch included in the operation switch group 127 has been turned OFF. On the other hand, if turning ON of the Sw1 has been detected in step S5, the camera MPU 125 advances the procedure to step S6, and sets (selects) a focus detection area to be focused on. Here, the focus detection area may be a region designated by a photographer, or may automatically be set by the camera MPU 125 based on the information on the defocus amounts of the three focus detection areas that were obtained in step S4 and information on distances from the centers of the capturing ranges of the focus detection areas. Typically, it is likely that an object that the photographer intends to capture is located at a position having a short capturing distance and in the vicinity of the center of the capturing range, and thus, in a case where a plurality of objects exist for example, the camera MPU 125 selects a focus detection area that is considered as appropriate, taking into consideration these conditions. Furthermore, in a case where it is considered that there is one object and other than the object is the background, the camera MPU 125 also selects a focus region in which the object is located.

In step S7, the camera MPU 125 determines whether or not the absolute value of the defocus amount detected in the selected focus detection area is a predetermined permissive value or less, in other words, whether or not the camera is in an in-focus state. If it is determined that the absolute value is a permissive value or less, that is, the camera is in the in-focus state, the camera MPU 125 advances the procedure to step S15, and displays, on the display device 126, a mark indicating that the camera is brought into focus, or the like.

On the other hand, if it is determined that the absolute value of the defocus amount detected in the selected focus detection area is greater than the permissive value, and the camera is not in the in-focus state, the camera MPU 125 advances the procedure to step S8, and determines whether or not the absolute value of the detected defocus amount is less than a threshold 1. The set threshold 1 is here set to a value that is greater than the permissive value that was used for the focus determination. If the absolute value of the detected defocus amount is the threshold 1 or more, the camera MPU 125 advances the procedure to step S9, and performs frame rate switching processing. Specifically, in order to perform focus detection control with a high speed, the camera MPU 125 switches the operation of the image sensor driving circuit 123 so that an image is captured with a frame rate that is higher than the normal frame rate of live view display. Thereafter, the processing in steps S1 to S3 are executed with the set frame rate although they are not clearly described in the processing loops of steps S10 to S12.

In the image-plane phase-difference detection AF, among the phase-difference detection AF, the detectable maximum defocus amount is small and, when a defocus amount is large, an image signal is likely to deform due to an adverse effect of vignetting, and thus reliability of the defocus amount deteriorates. Therefore, in order to perform focus detection with a high speed from the state in which the defocus amount is large to the in-focus state, it is efficient to increase the frequency of obtaining a pair of phase-difference detection signals during driving of the focus lens 104, and to improve the accuracy of phase-difference detection. In order to increase the frequency of obtaining output waveforms, it is only necessary to increase the frequency of capturing (frame rate) (this also means that the time interval of capturing is shortened).

Note that the frame rate of live view display that is displayed on the display device 126 may be changed in a similar manner, but it is also possible to perform live view display with the unchanged original frame rate. In this case, it is possible to perform display without displaying image data that is obtained with a high frame rate, or to combine images of a plurality of frames into an image of one frame and display the combined images.

If, in step S8, it is determined that the detected defocus amount is less than the threshold 1, or after the frame rate switching processing in step S9 was performed, the camera MPU 125 advances the procedure to step S10. In step S10, the camera MPU 125 converts the detected defocus amount and direction into a lens driving amount and direction. Note that, if the sign of the lens driving amount means the driving direction, it is not necessary to obtain again the driving direction. The camera MPU 125 transmits the lens driving amount (and direction) to the lens MPU 117, and the lens MPU 117 drives the focus lens 104. Note that it is also possible that the camera MPU 125 obtains the position of the focus lens 104 from the lens MPU 117, obtains, by reflecting the lens driving amount (and direction) on the obtained position, the destination position of the focus lens 104 after movement, and transmits the obtained position to the lens MPU 117.

Then, the camera MPU 125 obtains a defocus amount in step S11, as with in step S4, and determines, in step S12, as with in step S7, whether or not the camera is in focus. If the absolute value of the detected defocus amount is greater than the permissive value and it is determined that the camera is not in focus, the camera MPU 125 returns the procedure to step S10, and drives the focus lens 104 based on the detected defocus amount. On the other hand, if the absolute value of the detected defocus amount is the permissive value or less, and it is determined that the camera is in focus, the camera MPU 125 advances the procedure to step S13.

If, in step S13, the current frame rate is the high frame rate set in step S9, the camera MPU 125 returns the high frame rate to the original frame rate in step S14. This is to save power after the camera is brought into focus, because driving with a high frame rate consumes much power. The camera MPU 125 advances the procedure to step S15, and displays, on the display device 126, that the camera is in focus, immediately if the frame rate has not been changed in step S9, or after the frame rate has been switched to the original frame rate in step S14 if the frame rate has been changed in step S9.

In step S16, the camera MPU 125 detects turning ON/OFF of a switch Sw2, which indicates an instruction to start capturing. A release (capturing trigger) switch, which is a switch of the operation switch group 127, can detect turning ON/OFF of two stages depending on the pressed amount, and the above-described turning ON/OFF of the Sw2 corresponds to turning ON/OFF of the second stage of the release (capturing trigger) switch. If turning ON of the Sw2 has not been detected in step S16, the camera MPU 125 maintains the stand-by state for standing by the instruction to start capturing, as long as turning OFF of the Sw1 is not detected in step S17. If turning OFF of the Sw1 has been detected in step S17, the camera MPU 125 advances the procedure to step S18.

If turning ON of the Sw2 has been detected in step S16, the camera MPU 125 advances the procedure to step S300, and executes a capturing sub-routine. The capturing sub-routine will be described in detail later.

After the processing of the capturing sub-routine has ended in step S300, the camera MPU 125 advances the procedure to step S18, and determines whether or not the main switch has been turned OFF, and if it is determined that the main switch has not been turned OFF, the procedure returns to step S2, and if it is determined that the main switch has been turned OFF, the series of the operations end.

Figure 8:
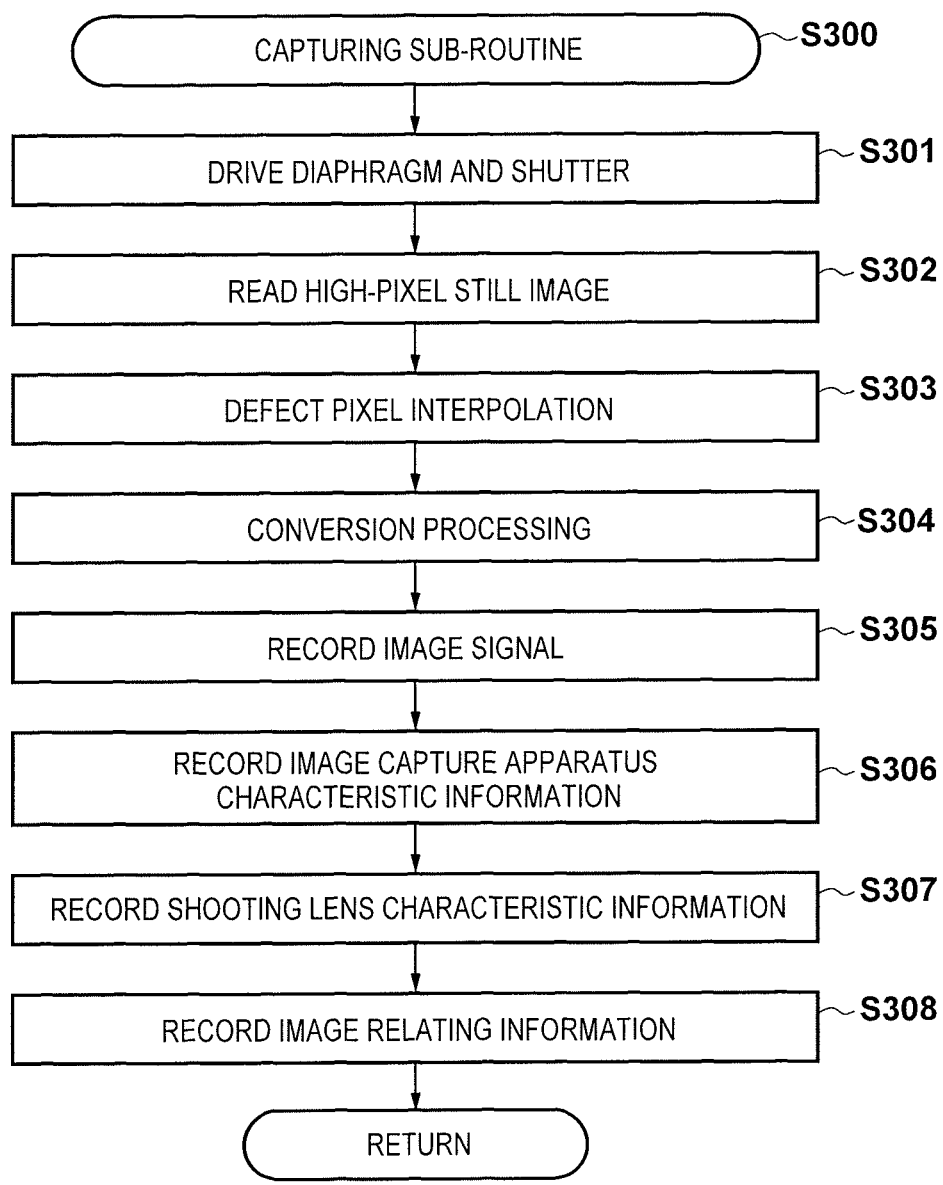
FIG. 8 is a flowchart illustrating a capturing sub-routine of the digital camera of the embodiment.

The following will describe the capturing sub-routine that is executed in step S300 of FIG. 7 in detail with reference to the flowchart shown in FIG. 8. Series operations of the present sub-routine are also realized mainly by the camera MPU 125. Note that, similar to an ordinary digital camera, the digital camera of the present embodiment as well performs, when turning ON of the switch Sw1 has been detected, not only focus detection processing but also exposure control processing, and determines the capturing condition (shutter speed, f-number, and capturing sensitivity), although descriptions thereof are omitted in FIG. 7. This exposure control processing can be performed by the camera MPU 125 based on luminance information on the image data, but any well-known technique may also be used.

In step S301, the camera MPU 125 transmits the determined f-number and shutter speed to the lens MPU 117, and controls the operation of the diaphragm shutter 102. Furthermore, the camera MPU 125 lets the image sensor driving circuit 123 accumulate an electric charge during a time period in which the image sensor 122 is exposed via the diaphragm shutter 102.

When the exposure time period has elapsed, the camera MPU 125 lets, in step S302, the image sensor driving circuit 123 read an image for high-pixel still image capturing, that is, read all the pixels. In step S303, the camera MPU 125 lets the image processing circuit 124 perform defect pixel correction processing (defect pixels including focus detection pixels) on the read image data. In the configuration of the present embodiment, an output of the focus detection pixel does not have RGB color information for capturing an image, and thus the focus detection pixel corresponds to a defect pixel in terms of obtaining an image, so an image signal is generated by interpolation based on information on image capture pixels in the vicinity of the focus detection pixel. In step S304, the camera MPU 125 lets the image processing circuit 124 perform image processing such as demosaicing (color interpolation) processing, white balance processing, γ correction (tone correction) processing, color conversion processing, or edge emphasis processing, coding processing, or the like on the image data that was subjected to the defect pixel correction. In step S305, the camera MPU 125 records an image data file in the memory 128.

In step S306, the camera MPU 125 records characteristic information on the camera main body 120 in the memory 128 and a memory of the camera MPU 125, in association with the captured image recorded in step S305. Here, examples of the characteristic information on the camera main body 120 include the following information:

Capturing condition (such as f-number, shutter speed, and capturing sensitivity);
Information on image processing applied by the image processing circuit 124;
Information on light reception sensitivity distribution of image capture pixels and focus detection pixels of the image sensor 122;
Information on vignetting of a light flux to be captured in the camera main body 120;
Information on a distance between the mounting surface on which the camera main body 120 and the lens unit 100 are mounted, and the image sensor 122; and
Manufacturing error information.

Note that the information on light reception sensitivity distribution of image capture pixels and focus detection pixels of the image sensor 122 is information depending on the on-chip microlens ML and the photoelectric conversion area PD, and thus it is also possible to record information on these members.

In step S307, the camera MPU 125 records the characteristic information on the lens unit 100 in the memory 128 and in the memory in the camera MPU 125, in association with the captured image recorded in step S305. Examples of the characteristic information of the lens unit 100 include information on the exit pupil 411, frame information, information on the focal length or F number in capturing, aberration information, manufacturing error information, and the like. In step S308, the camera MPU 125 records image relating information, which is information on the captured image, in the memory 128 and the memory in the camera MPU 125. The image relating information may include information on the focus detection operation before capturing, object movement information, and information on the accuracy of the focus detection operation.

When the processing in step S308 has ended, the camera MPU 125 ends the capturing sub-routine in step S300, and the procedure advances to step S18 of the main routine.

The following will describe the reason for determining, in step S8 of FIG. 7, whether or not to switch (increase) the frame rate based on the relationship of the detected defocus amount to the threshold 1.

Figure 9:
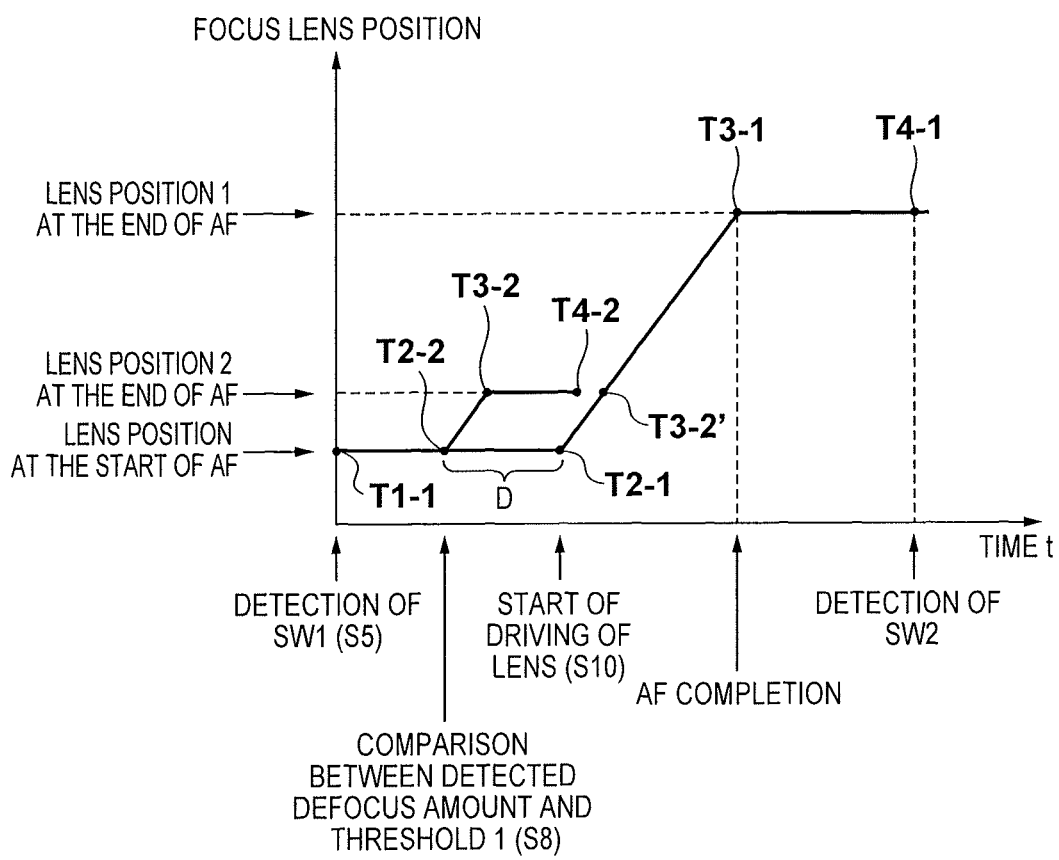
FIG. 9 is a diagram illustrating the relationship of the focus lens positions to time periods during the focus detection according to the first embodiment.

FIG. 9 shows the relationship of the position of the focus lens 104 to time during the processing from steps S5 to S15 of FIG. 7. In FIG. 9, the lateral axis indicates time, and the vertical axis indicates the positions of the focus lens 104. It is assumed that the original point (t=0) of the lateral axis is a time when turning ON of the switch Sw1 has been detected in step S5 of FIG. 7.

A course from the lens position at the start of the focus detection processing to the lens position 1 at the end of AF at which the defocus amount is large will be described with reference to FIGS. 9 and 7. First, when turning ON of the switch Sw1 has been detected at a time T1-1 (t=0), a focus detection area is set in step S6. In step S7, it is determined that the camera is not in focus because the defocus amount detected in step S4 is greater than the permissive value. If it is determined that the detected defocus amount is the threshold 1 or more at a time T2-2 (step S8), the frame rate is switched to a high frame rate for performing focus detection processing with a high speed.

Since switching of the frame rate requires to perform a reset operation of an exposure, a certain amount of time period D is necessary. After the frame rate switching processing has been ended and the image sensor has been driven with a high frame rate, driving of the lens based on the detected defocus amount is started from a time T2-1 (step S10). The focus detection processing (step S11) and the focus determination (step S12) are repeatedly performed based on the image data obtained during the driving of the lens, and when the lens reached the lens position 1 at the end of AF at a time T3-1, the driving of the lens is stopped. At that time, the camera is determined to be in the in-focus state, and it is determined whether or not a high frame rate is set (step S13). Since the frame rate has been switched to the high frame rate as described above, processing for returning the frame rate to the original frame rate is performed (step S14) and it is displayed that the camera is in focus (step S15).

Figure 12:
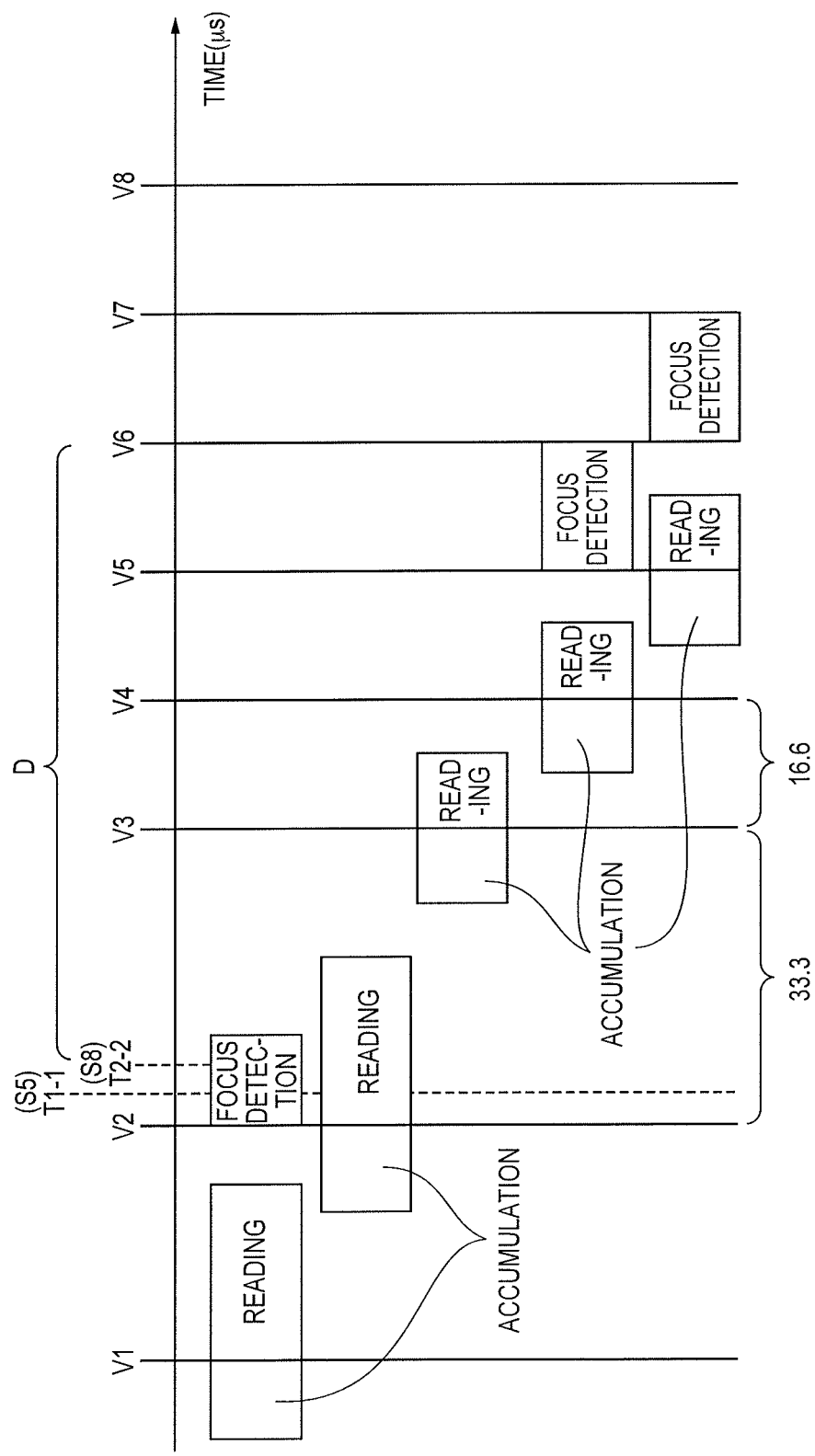
FIG. 12 is a timing chart illustrating frame rate switching processing of the first embodiment.

The time period D that is needed until the start of driving of the lens in the case where the frame rate has been switched will further be described with reference to FIG. 12 showing the timing chart before and after the frame rate switching processing. The lateral axis indicates time, and V1 to V8 show timings of a V synchronization signal, where the frame rate is increased twofold between the timings. First, a signal that is completely accumulated at the timing of V1 is read by the image sensor between V1 and V2, and focus detection using the read signal is started at the timing of V2. If turning ON of the Sw1 has been detected at the timing of T1-1 after V2 and it is determined at the timing of T2-2 that the defocus amount is the threshold 1 or more, the camera MPU 125 starts the frame rate switching processing and thus does not perform the focus detection using a signal read at the timing of V2.

Focus detection using a signal read at the timing of V3 is also not performed, because an interval between a reset operation timing and a read timing varies for each row and accurate focus detection is not possible using a signal read at the timing of V3 immediately after the frame rate has been switched. Therefore, the focus detection that is first performed after the frame rate switching processing is one using a signal read at the timing of V4, and driving of the lens will be performed when the result of the focus detection is obtained at the timing of V6. Accordingly, a certain amount of time is needed for performing the frame rate switching processing and obtaining the focus detection result after switching. For example, up to 33.3 ms is needed between T2-2 and V3 of FIG. 12 when the frame rate is changed from 30 fps to 60 fps, and 16.6×3=49.8 ms, that is, a time of about 80 ms is needed between V3 and V6 after the frame rate has been switched to 60 fps.

Then, a course from the lens position at the start of AF to a lens position 2 at the end of AF at which the defocus amount is small will be described. Assuming that the frame rate is switched at the time T2-2, similarly to the case of the lens position 1 at the end of AF, the driving of the focus lens based on the detected defocus amount is started at the time T2-1 at which a certain amount of time period D has elapsed, and the focus lens reaches the lens position 2 at the end of AF at a time T3-2'.

On the other hand, when the frame rate is not switched to a high frame rate at the time T2-2, the driving of the focus lens based on the detected defocus amount is started at the time T2-2, and thus the focus lens reaches the lens position 2 at the end of AF at a time T3-2. Accordingly, if the frame rate is switched to a high frame rate irrespective of the defocus amount, there may be the case where it takes a longer time for the focus lens to reach the in-focus position when the defocus amount is not great than the case where the frame rate is not switched. By not switching the frame rate, it is possible to drive the lens in the time period between T1-1 to V3 of FIG. 12, allowing focus adjustment with a higher speed.

Therefore, in the present embodiment, it is determined whether or not to switch to a high frame rate based on the detected defocus amount. The threshold 1 with which the defocus amount is compared in step S8 is thus determined based on the minimum value of the defocus amount with which the time required for focus detection can be reduced when the frame rate is increased, even if a time is required for switching of the frame rate. This value varies depending on the image capture apparatus and the driving circuit thereof, and the driving properties of the focus lens of the digital camera, and thus is determined in advance for each type of device. Furthermore, in the case of a lens-exchangeable digital camera, it is also possible that a standard threshold that is stored in the main body is corrected according to the device type of the lens. Note that the threshold 1 may be set as needed, also taking into consideration a time required when the frame rate is returned to the original value after the focus lens has been driven to the in-focus position.

Note that, as described above, it is also possible to perform the image-plane phase-difference detection AF solely or in combination with the contrast AF using the TVAF focus detection unit 130. In this case, at the start of the focus detection operation, it is also possible to compare a contrast evaluation value with a predetermined threshold, and determine whether or not the frame rate is switched to a high frame rate. Since a contrast evaluation value depends on the defocus amount, the same evaluation as that of step S8 can be performed even using a contrast evaluation value. There is no difference in that the frame rate is not switched to a high frame rate if it is determined that a defocus amount is smaller than the threshold. Furthermore, both methods may be combined such that, at the start of the focus detection operation, it is determined whether or not to switch to a high frame rate based on a focus detection result by the image-plane phase-difference detection AF, and thereafter the contrast AF is used.

Furthermore, the present embodiment is configured such that, when a frame rate is switched to a high frame rate, the focus lens 104 is moved to the in-focus position, and when the focus detection processing ends, the frame rate is returned (switched) to the original frame rate. However, the timing at which the frame rate is returned to the original frame rate is not necessary a timing after the camera is brought into focus. That is, it is possible to return the frame rate to the normal frame rate at a time when a sufficiently high accurate defocus amount has been obtained. Specifically, during execution of the image-plane phase-difference detection AF, the accuracy of the detected defocus amount increases as the camera approaches the in-focus state, and thus it is also possible to start processing for returning the frame rate to the original frame rate at the point where the defocus amount is less than a predetermined amount. This threshold may be identical to the threshold 1 for example, or may also be another threshold. Similarly when focus detection of the contrast detection method is used in combination with the image-plane phase-difference detection AF, it is possible to start the processing for returning the frame rate to the original frame rate at the point where the maximum value of the contrast evaluation value (AF evaluation value) has been detected. With this, the procedure can shift to the capturing processing more rapidly.

According to the present embodiment, as has been described above, the focus detection apparatus that performs the image-plane phase-difference detection AF determines whether or not to switch a frame rate to a high frame rate based on a detected defocus amount.

Specifically, a frame rate is switched to a high frame rate when the detected defocus amount is a threshold or more, and is maintained as the normal frame rate when the detected defocus amount is less than the threshold. Accordingly, it is possible to realize both the high speed focus detection when the defocus amount is large, and suppression of an increase in time required for focus detection, the increase occurring due to the time for switching the frame rate, in particular, when the defocus amount is small.

Note that the present embodiment has described a configuration in which a normal frame rate and a high frame rate are switched, for ease of description and understanding. However, it is also possible to configure that the larger number of types of frame rates are switched.

Furthermore, a configuration is also possible in which the image sensor 122, instead of the focus lens 104, is driven to perform focus detection. In this case, a mechanism for driving the image sensor is provided on the camera main body 120, and the camera MPU 125 is configured to control driving.

Second Embodiment

A second embodiment of the present invention will be described with reference to FIGS. 10 and 11. The second embodiment differs from the first embodiment mainly in that the driving speed of the focus lens is changed depending on an update interval of focus detection information (defocus amount) or the frame rate of capturing. In the first embodiment, the driving speed of the focus lens in step S10 is constant, irrespective of the detected defocus amount. Accordingly, when focus detection is performed with a normal frame rate in which an update interval of a defocus amount is longer than that of a high frame rate, a movement amount of the lens in the update interval of the defocus amount will increase, and the accuracy of the defocus amount may be insufficient.

The present embodiment is therefore characterized in that, when a focus detection operation is performed without switching to a high frame rate, the driving speed of the focus lens is reduced, thereby suppressing deterioration of the accuracy of the focus detection information even if the frame rate is not high.

Note that the block diagram (FIG. 1) of the digital camera, the diagrams (FIGS. 2 to 5) illustrating the focus detection method using the focus detection pixels in the image sensor, and the diagrams (FIGS. 6A and 6B) illustrating the focus detection areas of the first embodiment can also be used in the present embodiment, and thus descriptions thereof are omitted.

Figure 10:
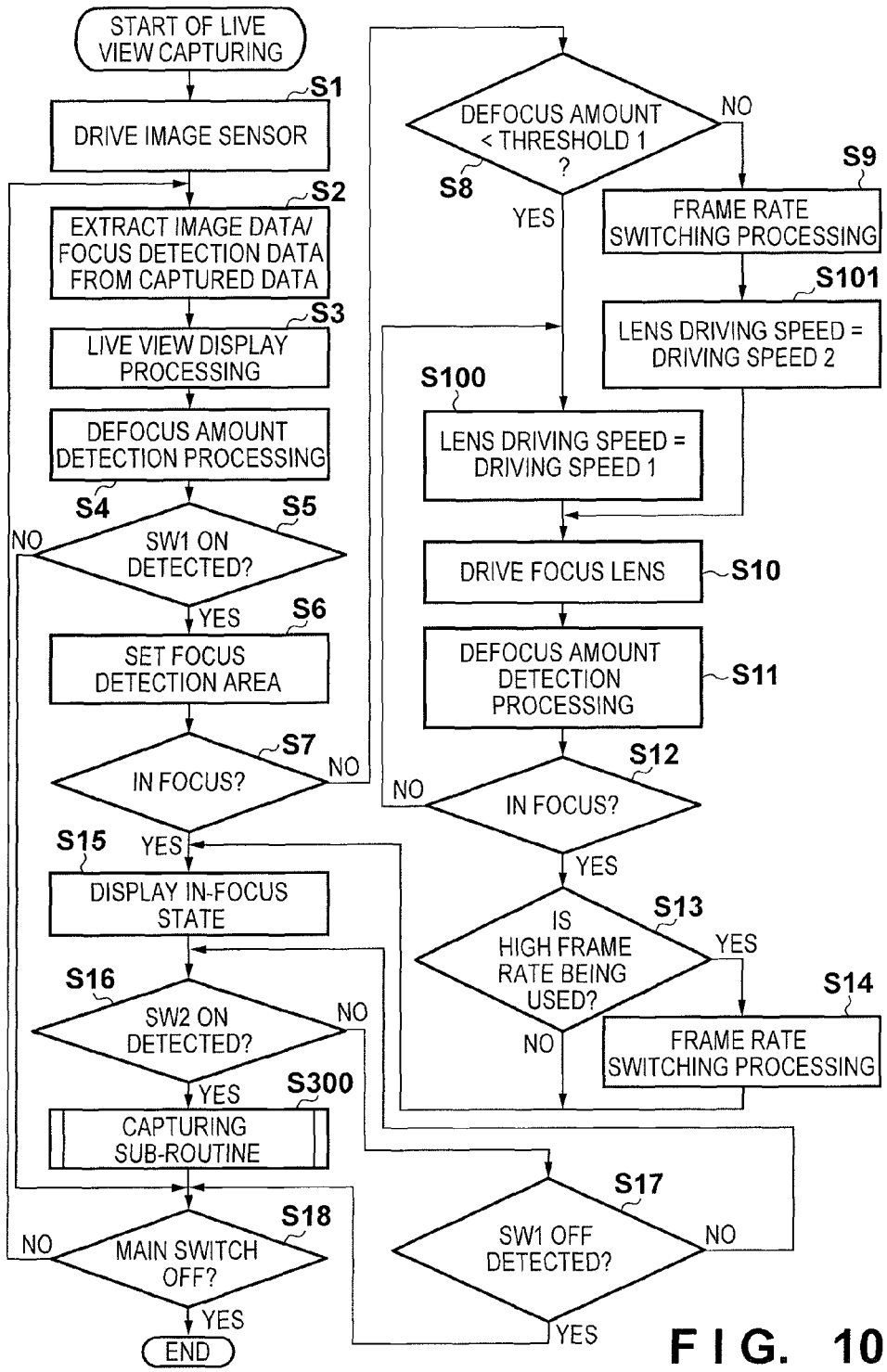
FIG. 10 is a flowchart illustrating focus detection and capturing operations of a digital camera according to a second embodiment.

FIG. 10 is a flowchart illustrating focus detection and capturing operations of a digital camera of the present embodiment. The processing from steps S1 to S9 are the same as those of FIG. 7 of the first embodiment, and thus description thereof is omitted.

If, in step S8, it is determined that the absolute value of the detected defocus amount is less than the threshold 1, the camera MPU 125 advances the procedure to step S100, and sets the driving speed of the focus lens 104 to the driving speed 1.

On the other hand, after the frame rate has been switched to a high frame rate in step S9, the camera MPU 125 sets the driving speed of the focus lens 104 to the driving speed 2.

In the present embodiment, the driving speed 1 is set to a value that is slower than the driving speed 2. In a method for setting the driving speed, update intervals required for securing the sufficient focus detection accuracy are defined taking into consideration distances between the lens positions, and the driving speed 1 is set to be slower than the driving speed 2 according to the ratio of a first update interval to a second update interval.

The processing from steps S10 onward is the same as those of FIG. 7 of the first embodiment, and thus descriptions thereof are omitted.

Figure 11:
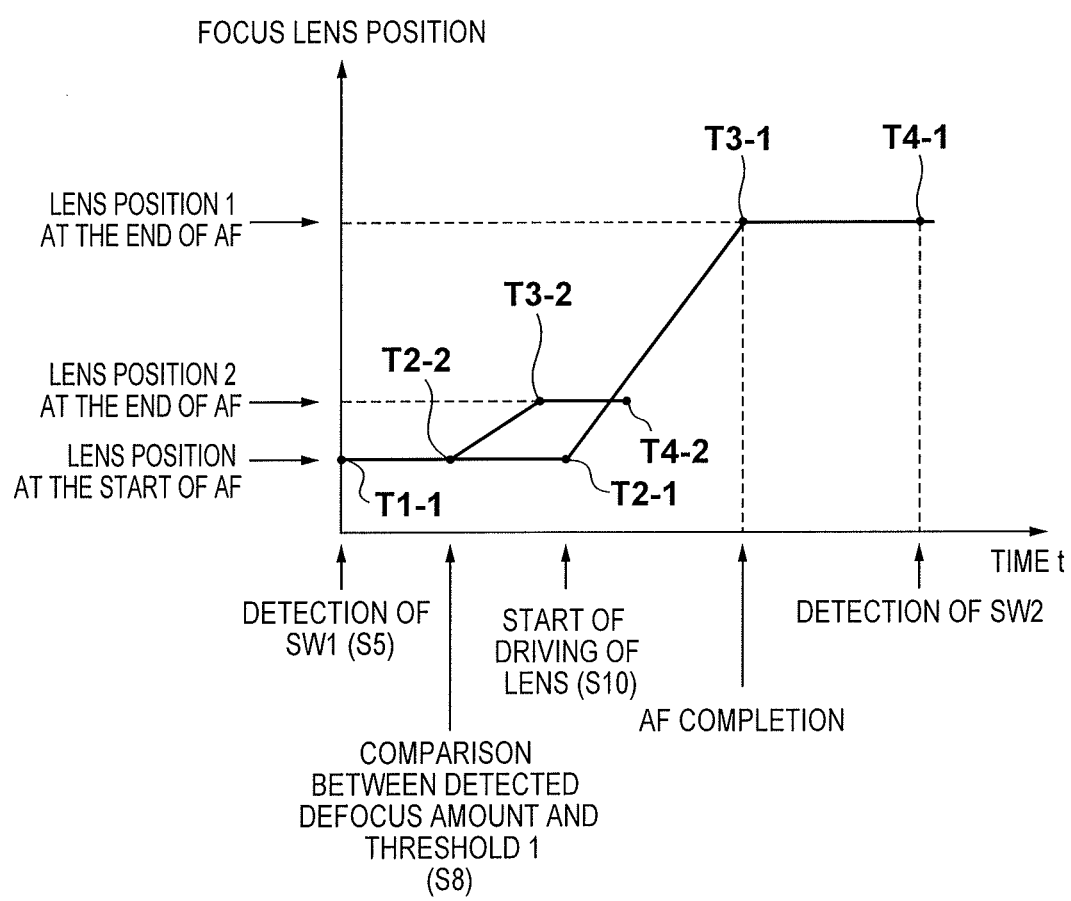
FIG. 11 is a diagram illustrating the relationship of the focus lens positions to time periods during the focus detection according to the second embodiment.

FIG. 11 is a diagram illustrating the relationship of the position of the focus lens 104 to time during the processing from steps S5 to S15 of FIG. 10. In FIG. 11, the lateral axis indicates time, and the vertical axis indicates the positions of the focus lens 104. The origin (t=0) of the lateral axis is a time at which turning ON of the switch Sw1 has been detected in step S5 of FIG. 10.

FIG. 11 differs from FIG. 9 in the lens driving speed with which the lens is driven from the lens position at the start of AF to the lens position 2 at the end of AF. The slope from T2-2 to T3-2 of FIG. 11 denotes the lens driving speed 1. On the other hand, the slope from T2-1 to T3-1 denotes the lens driving speed 2. Since, as shown by the slopes, the lens driving speed 1 is slower than the lens driving speed 2, more accurate focus detection is possible with the lens driving speed 1, as described above. Furthermore, since the percentage of the lens driving time in the focus detection processing is not so high, even if the lens driving speed is set to be slow, it is possible to realize focus detection processing with a higher speed than in the case where the frame rate is switched irrespective of the defocus amount. For example, the lower limit of the lens driving speed 1 can be set in a range in which the lens can reach the lens position 2 at the end of AF more rapidly than in the case where the frame rate is switched. Furthermore, the lens driving speed 1 may be set dynamically depending on the defocus amount.

In the present embodiment, in addition to the effects of the first embodiment, an improvement in the focus detection when the defocus amount is small can be achieved, by setting the lens driving speed to a slower speed when the frame rate is not switched than when the frame rate is switched.

Modification 1

Note that the present embodiment is configured such that focus determination with respect to a detected defocus amount is performed based on a first threshold (permissive value), and setting (changing) of the frame rate and setting of the lens driving speed are performed based on a second threshold (threshold 1).

This is to maintain the high accuracy of focus detection during driving of the lens on the premise that focus detection is performed also during driving of the lens. On the other hand, there is a case where it is expected, before driving of the lens, that the camera will be brought into the in-focus state by driving the lens based on the detected defocus amount without performing focus detection during driving of the lens. In this case, following processing can be performed using a threshold 2 as well, which is larger than the threshold (permissive value) for use in the focus determination and is smaller than the threshold (threshold 1) for determining whether or not frame rate switching processing is performed.

When the detected defocus amount is the threshold 2 or less, it is determined that focus detection does not need to be performed during driving of the lens, and the lens driving speed is set to the above-described driving speed 2. Note that the lens driving speed that can be set is not limited to the driving speed 2, and may be any lens driving speed that is higher than the driving speed 1, including a driving speed that is higher than the driving speed 2.

On the other hand, when the detected defocus amount is greater than the threshold 2 and less than the threshold 1, the frame rate is not switched to a high frame rate and the lens driving speed is set to the driving speed 1, and focus detection is performed. Furthermore, when the detected defocus amount is not less than the threshold 1, the frame rate is switched to a high frame rate and the lens driving speed is set to the driving speed 2, as described above, and focus detection is performed.

With this configuration, when the detected defocus amount is small, it is possible to increase the number of situations in which focus detection with a higher speed is possible while maintaining the focus detection accuracy.

Modification 2

Note that the present embodiment is configured such that focus determination with respect to the detected defocus amount is performed based on the first threshold (permissive value), and setting (changing) of the frame rate and setting of the lens driving speed are performed based on the second threshold (threshold 1). Furthermore, it is configured such that, when the detected defocus amount is less than the threshold 1, the frame rate is set to a low frame rate and the lens driving speed is set to a slow speed, and when the detected defocus amount is the threshold 1 or more, the frame rate is set to a high frame rate and the lens driving speed is set to a high speed.

This is to maintain the high accuracy of focus detection during driving of the lens on the premise that focus detection is performed also during driving of the lens. However, when the detected defocus amount is small, there is a case where it is expected, before driving of the lens, that the camera will be brought into the in-focus state by driving the lens based on the detected defocus amount without performing focus detection during driving of the lens. On the other hand, when the detected defocus amount is large, since the obtained defocus amount has low reliability, a shorter update interval of the defocus amount can be set.

In this case, following processing can be performed based on the threshold (threshold 1), which is for determining whether or not frame rate switching processing is performed and is larger than the threshold (permissive value) for use in the focus determination:

When the detected defocus amount is the threshold 1 or less, it is determined that focus detection does not need to be performed during driving of the lens, and the lens driving speed is set to the above-described driving speed 2. Note that the lens driving speed that can be set is not limited to the driving speed 2, and may be any lens driving speed that is higher than the driving speed 1, including a driving speed that is higher than the driving speed 2.

On the other hand, when the detected defocus amount is the threshold 1 or more, the frame rate is switched to a high frame rate, and the lens driving speed is set to the driving speed 1, and focus detection is performed.

With this configuration, when the detected defocus amount is small, it is possible to increase the number of situations in which focus detection with a higher speed is possible while maintaining the focus detection accuracy. On the other hand, when the detected defocus amount is large, it is possible to increase the focus detection accuracy.

Furthermore, similarly to Modification 1, following processing can be performed together with the threshold 2, which is larger than the threshold (permissive value) for use in the focus determination and is smaller than the threshold (threshold 1) for determining whether or not frame rate switching processing is performed.

When the detected defocus amount is the threshold 2 or less, it is determined that focus detection does not need to be performed during driving of the lens, and the lens driving speed is set to the above-described driving speed 2. Note that the lens driving speed that can be set is not limited to the driving speed 2, and may be any lens driving speed that is higher than the driving speed 1, including a driving speed that is higher than the driving speed 2.

On the other hand, when the detected defocus amount is greater than the threshold 2 and less than the threshold 1, the frame rate is not switched to a high frame rate and the lens driving speed is set to the driving speed 1, and focus detection is performed. Furthermore, when the detected defocus amount is not less than the threshold 1, the frame rate is switched to a high frame rate and the lens driving speed is set to the driving speed 1, as described above, and focus detection is performed.

With this configuration, when the detected defocus amount is small, it is possible to increase the number of situations in which focus detection with a higher speed is possible while maintaining the focus detection accuracy. On the other hand, when the detected defocus amount is large, it is possible to increase the focus detection accuracy.

Third Embodiment

A third embodiment of the present invention will be described with reference to FIG. 13. The third embodiment differs from the first embodiment mainly in that driving of the focus lens is started at the same timing irrespective of the detected defocus amount. In the first embodiment, when the detected defocus amount is large, the frame rate switching processing in step S9 is completed, and then driving of the focus lens is performed in step S10. Accordingly, as has been described with reference to FIG. 12, when the frame rate switching processing is performed, it takes a time until a focus detection result is obtained, resulting in a long focus adjustment time.

Accordingly, the present embodiment is characterized in that, even when the frame rate is switched, the focus lens is driven during switching of the frame rate, using a focus detection result that was obtained previously.

Note that the following figures used in the first embodiment can also be used, and thus descriptions thereof are omitted. That is, the block diagram (FIG. 1) of the digital camera, the diagrams (FIGS. 2 to 5) illustrating the focus detection method using the focus detection pixels in the image sensor, the diagrams (FIGS. 6A and 6B) illustrating the focus detection areas, and the flowchart (FIG. 7) illustrating a focus detection and capturing operation of the digital camera.

According to the present embodiment, in the flowchart of FIG. 7, the frame rate switching processing in step S9 is started and the procedure advances to step S10 before the switching processing is completed, and the focus lens is driven.

Hereinafter, a method for driving the focus lens that is performed in step S10 of FIG. 7 will be described.

Figure 13:
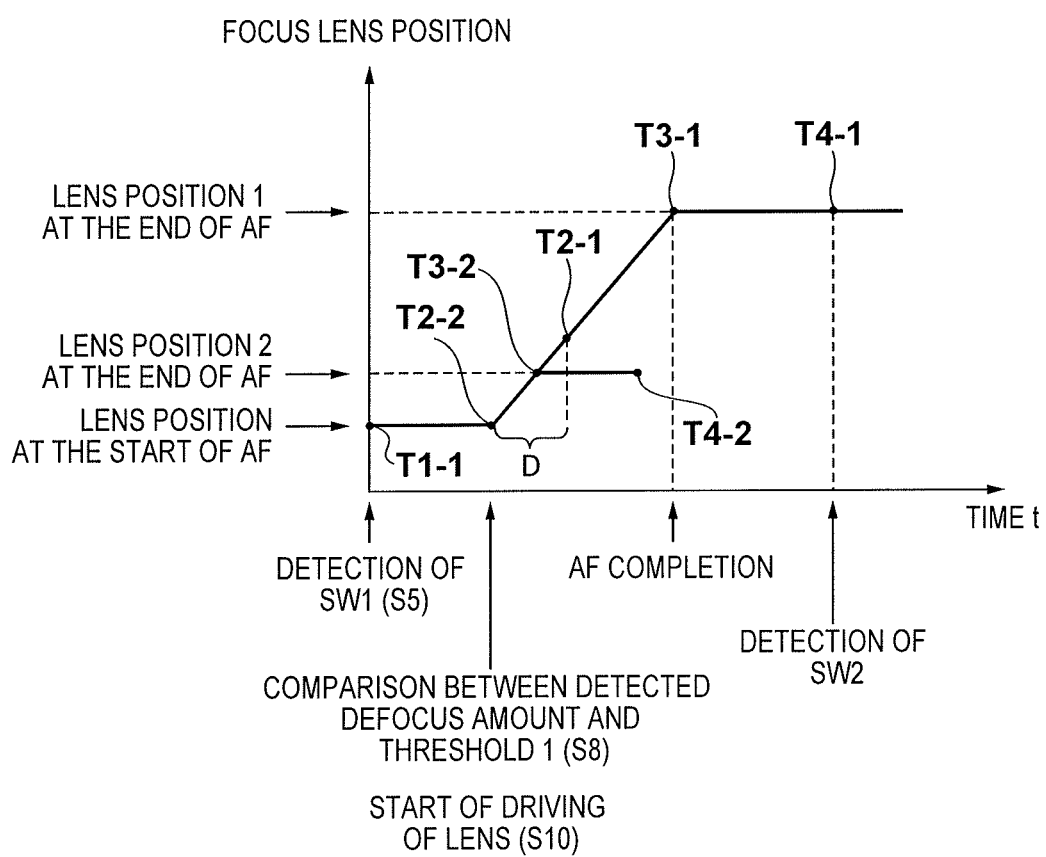
FIG. 13 is a diagram illustrating the relationship of the focus lens positions to time periods during focus detection according to a third embodiment.

FIG. 13 is a diagram illustrating the relationship of the positions of the focus lens 104 to time during the processing from steps S5 to S15 of FIG. 1. In FIG. 13, the lateral axis indicates time, and the vertical axis indicates the positions of the focus lens 104. It is assumed that the original point (t=0) of the lateral axis is a time when turning ON of the switch Sw1 has been detected in step S5 of FIG. 7.

A course from the lens position at the start of the focus detection processing to the lens position 1 at the end of AF at which the defocus amount is large will be described with reference to FIGS. 13 and 7. First, when turning ON of the switch Sw1 has been detected at the time T1-1 (t=0), a focus detection area is set in step S6. In step S7, it is determined that the camera is not in focus because the defocus amount detected in step S4 is greater than the permissive value. If it is determined that the detected defocus amount is the threshold 1 or more at the time T2-2 (step S8), the frame rate is switched to a high frame rate for performing focus detection processing with a high speed.

Since switching of the frame rate requires to perform a reset operation of an exposure, a certain amount of time period D is necessary. During the frame rate switching processing, driving of the lens is started using focus detection information that was obtained before the detection of the Sw1 (step S10). From the time T2-1, the driving of the lens is continued based on the defocus amount detected in the state in which the image sensor is driven with a high frame rate. That is, since a new focus detection result cannot be obtained between T2-2 and T2-1, driving of the lens based on the focus detection result obtained before detection of the Sw1 is performed. By appropriately setting the driving speed at the start of driving of the lens, it is possible to drive the lens so that the lens does not pass by the in-focus position at the timing of T2-1.

After the focus detection result can be obtained with a high frame rate, the focus detection processing (step S11) and the focus determination (step S12) are repeatedly performed based on the image data obtained during the driving of the lens, and when the lens reached the lens position 1 at the end of AF at the time T3-1, the driving of the lens stopped. At that time, the camera is determined to be in the in-focus state, and it is determined whether or not a high frame rate is set (step S13). Since the frame rate has been switched to the high frame rate as described above, processing for returning the frame rate to the original frame rate is performed (step S14) and it is displayed that the camera is in the in-focus state (step S15).

Accordingly, when the defocus amount is large, the lens is driven during the frame rate switching processing, making it possible to perform focus adjustment with a higher speed.

A course from the lens position at the start of AF to a lens position 2 at the end of AF at which the defocus amount is small is the same as that of the first embodiment. The driving of the focus lens based on the detected defocus amount is started at the time T2-2 and the focus lens reaches the lens position 2 at the end of AF at the time T3-2. After the start of the driving of the lens at T2-2, determination as to whether or not the lens has reached the in-focus position (step S12) will need to be made by the time the focus adjustment is completed, the determination requiring a focus detection result that is obtained in the vicinity of the in-focus position. When the frame rate has been switched, the focus detection result can be obtained at the timing of T2-1 after switching and thus it is not possible to determine, at T3-2, whether or not the camera is in the in-focus state. In the present embodiment, when the defocus amount is small, the frame rate switching processing is not performed, thereby making it possible to reduce the time period in which no focus detection result can be obtained and to rapidly complete focus adjustment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-214141, filed on Oct. 11, 2013, and No. 2014-150136, filed on Jul. 23, 2014 which are hereby incorporated by reference herein their entirety.

What is claimed is:

1. An image capture apparatus comprising
at least one processor or circuitry which functions as:
   a focus adjustment unit configured to perform focus adjustment using a phase-difference signal that is output from an image sensor;
   a computing unit configured to compute information on a defocus amount using the phase-difference signal that is output from the image sensor;
   a determination unit configured to determine, in response to a detection of preparation operations for capturing, that an in-focus state is not obtained if the information on a defocus amount is more than a permissive value and that the in-focus state is obtained if the information on a defocus amount is not more than the permissive value; and
   a control unit configured to control a frame rate with which the phase-difference signal is obtained,
   wherein in a case where the determination unit determines that the in-focus state is not obtained, the control unit sets the frame rate to:
      a first frame rate if the information on the defocus amount is equal to or more than a first threshold being larger than the permissive value;
      and a second frame rate, which is lower than the first frame rate, if the information on the defocus amount is less than the first threshold.

2. The image capture apparatus according to claim 1, wherein, in a case where the determination unit determines that the in-focus state is not obtained, the focus adjustment unit is moved to a position that corresponds to the defocus amount while the frame rate is maintained, if the information on the defocus amount is less than the first threshold.

3. The image capture apparatus according to claim 1, wherein, if the preparation operations for capturing have been detected:
   a driving speed of the focus adjustment unit is set to a second driving speed that is faster than a first driving speed when the information on the defocus amount is equal to or more than the first threshold; and
   the driving speed of the focus adjustment unit is set to the first driving speed when the information on the defocus amount is less than the first threshold and larger than the permissive value.

4. The image capture apparatus according to claim 1, wherein, if the preparation operations for capturing have been detected:
   focus detection is not performed during driving of the focus adjustment unit and a driving speed of the focus adjustment unit is set to a second driving speed that is faster than a first driving speed when the information on the defocus amount is equal to or less than a second threshold, the second threshold being smaller than the first threshold and larger than the permissive value; and
   the focus detection is performed during driving of the focus adjustment unit and the driving speed of the focus adjustment unit is set to the first driving speed when the information on the defocus amount is more than the second threshold and less than the first threshold.

5. The image capture apparatus according to claim 1, wherein, if the preparation operations for capturing have been detected:
   a driving speed of the focus adjustment unit is set to a first driving speed that is slower than a second driving speed when the information on the defocus amount is less than the first threshold; and
   the driving speed of the focus adjustment unit is set to the second driving speed when the information on the defocus amount is equal to or more than the first threshold.

6. The image capture apparatus according to claim 5, wherein the frame rate before the preparation operations for capturing have been detected is determined according to a frame rate of moving image capturing for live view display.

7. The image capture apparatus according to claim 1, wherein, while the frame rate with which the phase-difference signal is obtained is set to a frame rate that is faster than a frame rate before the preparation operations for capturing have been detected, the focus adjustment unit is moved according to the defocus amount.

8. The image capture apparatus according to claim 1, wherein the image sensor is a device that captures a pair of light fluxes that have passed through different regions of exit pupils of an image capture optical system, and captures an image for recording.

9. The image capture apparatus according to claim 1, wherein the focus adjustment unit is not moved if the determination unit determines that the in-focus state is obtained.

10. The image capture apparatus according to claim 1, wherein the second frame rate is equal to a frame rate before the preparation operations for capturing have been detected.

11. An image capture apparatus comprising
at least one processor or circuitry which functions as:
   a focus adjustment unit configured to perform focus adjustment using a focus detection signal;
   a computing unit configured to compute information on a defocus amount using the focus detection signal; and
   a determination unit configured to determine, in response to a detection of preparation operations for capturing, that an in-focus state is not obtained if the information on a defocus amount is more than a permissive value and that the in-focus state is obtained if the information on a defocus amount is not more than the permissive value; and
   a control unit configured to control a frame rate with which the focus detection signal is obtained,
   wherein in a case where the determination unit determines that the in-focus state is not obtained, the control unit sets the frame rate to:
      a first frame rate if the information on the defocus amount is equal to or more than a first.

12. The image capture apparatus according to claim 11, wherein the second frame rate is equal to a frame rate before the preparation operations for capturing have been detected.

13. A method for controlling an image capture apparatus, comprising:
performing focus adjustment using a phase-difference signal that is output from an image sensors;

computing information on a defocus amount using the phase-difference signal that is output from the image sensor;

determining, in response to a detection of preparation operations for capturing, that an in-focus state is not obtained if the information on a defocus amount is more than a permissive value and that the in-focus state is obtained if the information on a defocus amount is not more than the permissive value; and controlling a frame rate with which the phase-difference signal is obtained, wherein in a case where the determination unit determines that the in-focus state is not obtained, the controlling comprising:

setting the frame rate to a first frame rate if the information on the defocus amount is equal to or more than a first threshold being larger than the permissive value; and setting the frame rate to a second frame rate, which is lower than the first frame rate, if the information on the defocus amount is less than the first threshold.

14. The method for controlling an image capture apparatus according to claim 13, wherein the second frame rate is equal to a frame rate before the preparation operations for capturing have been detected.

15. A method for controlling an image capture apparatus, comprising:

performing focus adjustment using a focus detection signal;

computing information on a defocus amount using the focus detection signal;

determining, in response to a detection of preparation operations for capturing, that an in-focus state is not obtained if the information on a defocus amount is more than a permissive value and that the in-focus state is obtained if the information on a defocus amount is not more than the permissive value; and controlling a frame rate with which the focus detection signal is obtained, wherein in a case where the determination unit determines that the in-focus state is not obtained, the controlling comprising:

setting the frame rate to a first frame rate if the information on the defocus amount is equal to or more than a first threshold being larger than the permissive value; and setting the frame rate to a second frame rate, which is lower than the first frame rate, if the information on the defocus amount is less than the first threshold.

16. The method for controlling an image capture apparatus according to claim 15, wherein the second frame rate is equal to a frame before the preparation operations for capturing have been detected.

17. A non-transitory computer-readable storage medium having stored therein a program for causing a computer to function as an image capture apparatus comprising:

at least one processor or circuitry which functions as:

a focus adjustment unit configured to perform focus adjustment using a phase-difference signal that is output from an image sensor;

a computing unit configured to compute information on a defocus amount using the phase-difference signal that is output from the image sensor;

a determination unit configured to determine, in response to a detection of preparation operations for capturing, that an in-focus state is not obtained if the information on a defocus amount is more than a permissive value and that the in-focus state is obtained if the information on a defocus amount is not more than the permissive value; and a control unit configured to control a frame rate with which the phase-difference signal is obtained, wherein in a case where the determination unit determines that the in-focus state is not obtained, the control unit sets the frame rate to:

a first frame rate if the information on the defocus amount is equal to or more than a first threshold being larger than the permissive value; and a second frame rate, which is lower than the first frame rate, if the information on the defocus amount is less than the first threshold.

18. A non-transitory computer-readable storage medium having stored therein a program for causing a computer included in an image capture apparatus to function as:

a focus adjustment unit configured to perform focus adjustment using a focus detection signal;

a computing unit configured to compute information on a defocus amount using the focus detection signal;

a determination unit configured to determine, in response to a detection of preparation operations for capturing, that an in-focus state is not obtained if the information on a defocus amount is more than a permissive value and that the in-focus state is obtained if the information on a defocus amount is not more than the permissive value; and a control unit configured to control a frame rate with which the focus detection signal is obtained, wherein in a case where the determination unit determines that the in-focus state is not obtained, the control unit sets the frame rate to:

a first frame rate if the information on the defocus amount is equal to or more than a first threshold being larger than the permissive value; and a second frame rate, which is lower than the first frame rate, if frame rate when the information on the defocus amount is less than the first threshold.

* * * * *